US012743158B2

(12) United States Patent
Kanamura et al.

(10) Patent No.: US 12,743,158 B2
(45) Date of Patent: Sep. 22, 2026

(54) DISPLAY CONTROL DEVICE, DISPLAY CONTROL SYSTEM, DISPLAY METHOD, AND RECORDING MEDIUM

(71) Applicant: CASIO COMPUTER CO., LTD., Tokyo (JP)

(72) Inventors: Toshiaki Kanamura, Tokyo (JP); Kayoko Onoda, Tokyo (JP); Wataru Nimura, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/891,439

(22) Filed: Sep. 20, 2024

(65) Prior Publication Data

US 2025/0103143 A1 Mar. 27, 2025

(30) Foreign Application Priority Data

Sep. 25, 2023 (JP) ................................ 2023-159996

(51) Int. Cl.
*G06F 3/01* (2006.01)
*A63H 11/00* (2006.01)

(52) U.S. Cl.
CPC ............ *G06F 3/017* (2013.01); *A63H 11/00* (2013.01); *A63H 2200/00* (2013.01)

(58) Field of Classification Search
CPC ...... G06F 3/017; A63H 11/00; A63H 2200/00
See application file for complete search history.

(56) References Cited

U.S. PATENT DOCUMENTS 11,348,269 B1 * 5/2022 Ebrahimi Afrouzi ... G01S 17/48
2017/0003923 A1 * 1/2017 Hane .................. H04N 1/00411
2018/0326583 A1 * 11/2018 Baroudi ................ B25J 9/1661
2022/0066456 A1 * 3/2022 Ebrahimi Afrouzi ........................ G06F 3/04883
2023/0202026 A1 * 6/2023 Rus ........................ B25J 9/1664 700/264
2024/0282204 A1 * 8/2024 Kapoor ................... G06F 3/015

FOREIGN PATENT DOCUMENTS

JP 2002-172576 A 6/2002
JP 2003-311027 A 11/2003
JP 2020-032014 A 3/2020
JP 2022-051982 A 4/2022

* cited by examiner

*Primary Examiner* — Sahlu Okebato
(74) *Attorney, Agent, or Firm* — Scully, Scott, Murphy & Presser, P.C.

(57) ABSTRACT

In a terminal device, a control unit acquires a parameter value that is related to a robot executing a gesture according to an event, the parameter value changing according to the event. The control unit generates aggregate data of the acquired parameter value in a target period. The control unit causes a display unit to display the generated aggregate data.

11 Claims, 16 Drawing Sheets

| No. | GESTURE (GESTURE NAME) | GESTURE CONTROL PARAMETER | | | | |
|---|---|---|---|---|---|---|
| | | TIME (ms) | OPERATION PARAMETER | | CRY PARAMETER | |
| | | | TWIST MOTOR | VERTICAL MOTOR | VOICE | VOLUME (dB) |
| 1 | LOWERING HEAD | 100 | 0 | 0 | – | – |
| | | 100 | 0 | −45 | | |
| 2 | CHIRPING | 300 | – | – | PEEP | 60 |
| 3 | SHAKING HEAD | 100 | 0 | 0 | – | – |
| | | 100 | 34 | 0 | | |
| | | 100 | −34 | 0 | | |
| ⋮ | ⋮ | ⋮ | | | | |
| 101 | EXPRESSING SURPRISE | 100 | 0 | 0 | SQUEAL | 70 |
| | | 100 | 0 | −24 | | |
| | | 700 | 0 | −24 | | |
| | | 500 | 34 | −24 | | |
| | | 400 | −34 | −24 | | |
| | | 500 | 0 | 0 | | |
| 102 | EXPRESSING JOY | ... | ... | ... | ... | ... |
| 103 | EXPRESSING SADNESS | ... | ... | ... | ... | ... |
| ⋮ | ⋮ | ⋮ | | | | |

| DATE AND TIME | EMOTION PARAMETER | | PERSONALITY PARAMETER | | | | NUMBER OF OCCURRENCES OF EVENT (FOR EACH TRIGGER) | | | | | REMAINING BATTERY LEVEL | SLEEP | ... |
|---|---|---|---|---|---|---|---|---|---|---|---|---|---|---|
| yy/MM/dd hh:mm | X VALUE | Y VALUE | HAPPY | ACTIVE | SHY | WANTED | PATTED | SPOKEN TO | HIT | YELLED | ... | | | |
| 23/02/28 10:20 | 100 | 100 | 6 | 4 | 3 | 0 | 2 | 3 | 0 | 1 | ... | 75% | OFF | ... |
| 23/02/28 10:30 | 105 | 105 | 6 | 4 | 3 | 0 | 0 | 5 | 1 | 0 | ... | 75% | OFF | ... |
| ... | ... | | ... | | | | ... | | | | | ... | ... | ... |

| FIRST TYPE (POSITIVE EMOTION) | SECOND TYPE (NEGATIVE EMOTION) | OTHER TYPES |
|---|---|---|
| PATTED<br>SPOKEN TO<br>GENTLY SHAKED<br>HUGGED<br>⋮ | HIT<br>YELLED<br>STRONGLY SHAKEN<br>TURNED UPSIDE DOWN<br>⋮ | BRIGHTER<br>DARKER<br>SPECIFIC TIME HAS ARRIVED<br>MOVED TO SPECIFIC PLACE<br>⋮ |

FIG. 10

DISPLAY CONTROL DEVICE, DISPLAY CONTROL SYSTEM, DISPLAY METHOD, AND RECORDING MEDIUM

BACKGROUND

1. Technical Field

The present invention relates to a display control device, a display control system, a display method, and a recording medium.

2. Related Art

Among robots that simulate living things such as a pet and a human, a robot that executes a gesture in accordance with an event is known. For example, Japanese Patent Application Laid-Open No. 2020-032014 discloses an autonomous behavior type robot that changes one or more emotion parameters in accordance with an event, and generates a reaction report and provides the reaction report to a user when an emotion parameter satisfies a predetermined psychological condition.

SUMMARY

In order to achieve the above purpose, a display control device according to one aspect of the present disclosure includes one or more processors configured to acquire a parameter value that is related to a robot executing a gesture according to an event, the parameter value changing according to the event, generate aggregate data of the acquired parameter value in a target period, and cause a display unit to display the generated aggregate data.

BRIEF DESCRIPTION OF THE DRAWINGS

FIG. 7 is a diagram illustrating an example of gesture information according to the first embodiment;

FIG. 8 is a diagram illustrating an example of log information according to the first embodiment;

FIG. 9 is a diagram illustrating an example of an event classification table according to the first embodiment;

FIG. 10 is a diagram illustrating a display example of a diary screen according to the first embodiment;

DETAILED DESCRIPTION

Figure 1:
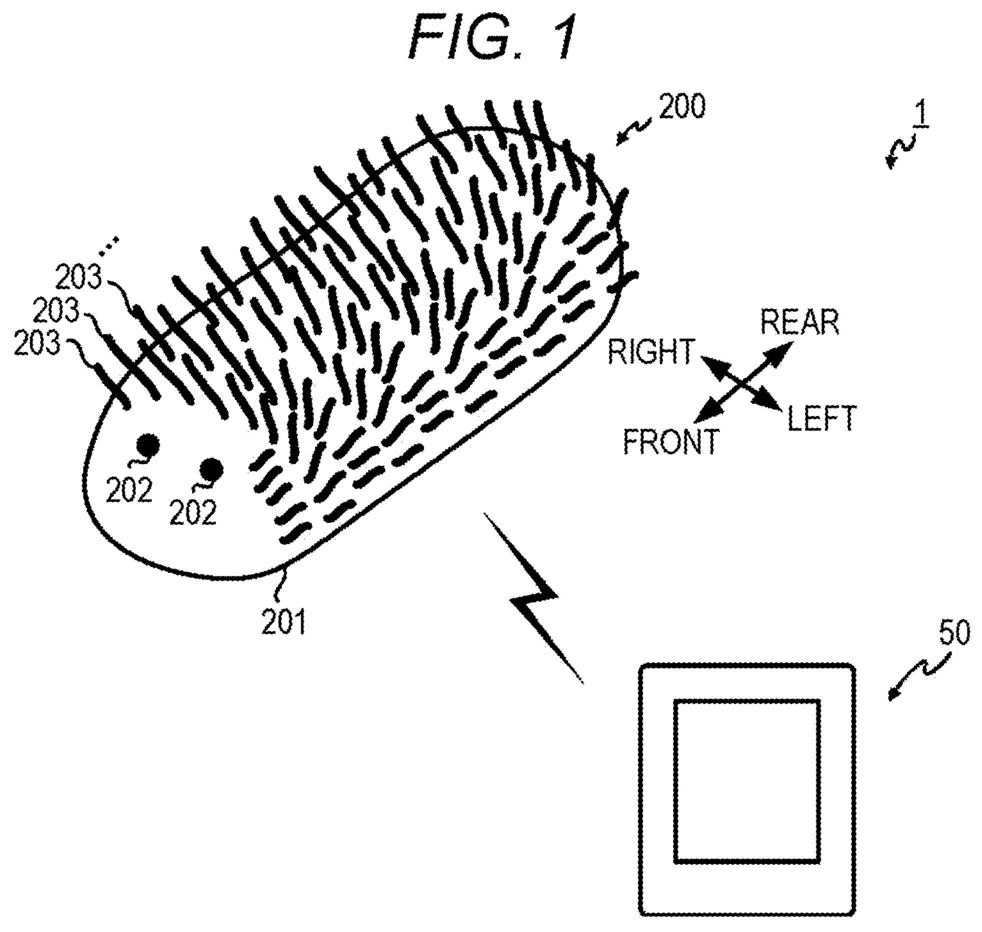
FIG. 1 is a diagram schematically illustrating an overall configuration of a robot system according to a first embodiment.

Hereinafter, embodiments of the present disclosure will be described with reference to the drawings. In the drawings, the same or corresponding parts are denoted by the same reference numerals.

First Embodiment

FIG. 1 schematically illustrates a configuration of a robot system 1 according to a first embodiment. The robot system 1 includes a robot 200 and a terminal device 50. The robot 200 is an example of a robot according to the first embodiment.

Figure 2:
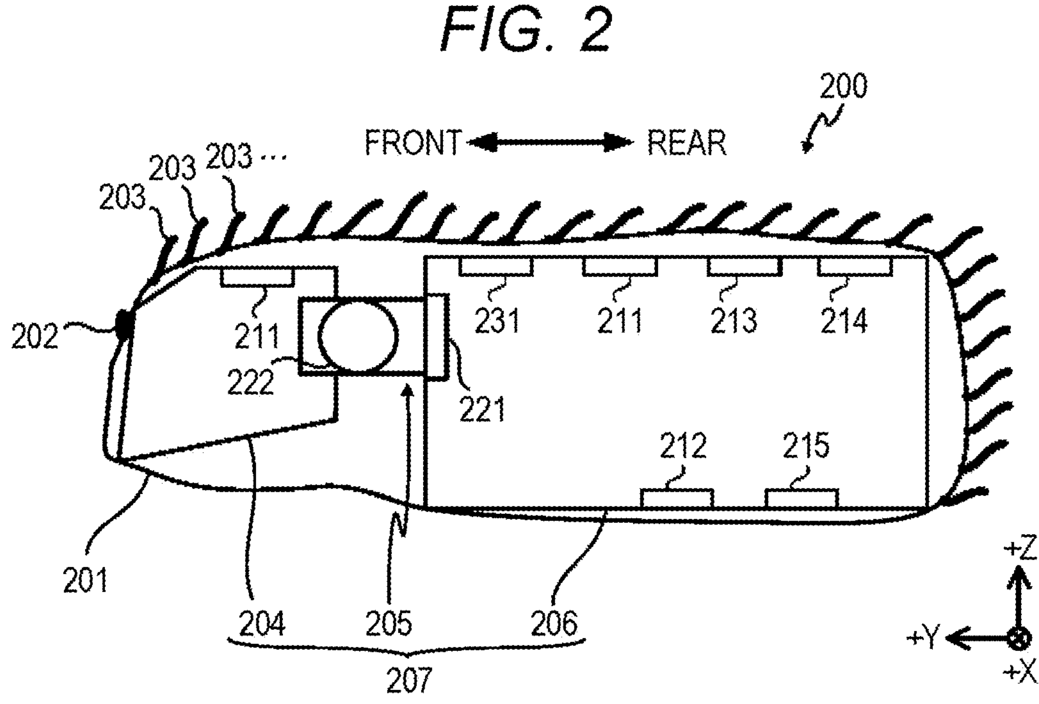
FIG. 2 is a cross-sectional view of a robot according to the first embodiment as viewed from a side surface.

The robot 200 according to the first embodiment includes an exterior 201, a decorative part 202, bushy bristles 203, a head portion 204, a connecting portion 205, a body portion 206, a housing 207, a touch sensor 211, an acceleration sensor 212, a microphone 213, an illuminance sensor 214, and a speaker 231 similar to those of a robot 200 disclosed in Japanese Patent Application Laid-Open No. 2023-115370, and the description thereof will be omitted. Note that the shape of the head portion 204 may be a shape illustrated in FIG. 2 or a shape disclosed in, for example, FIG. 2 of Japanese Patent Application Laid-Open No. 2023-115370.

The robot 200 according to the first embodiment includes a twist motor 221 and a vertical motor 222 similar to those of the robot 200 disclosed in Japanese Patent Application Laid-Open No. 2023-115370, and the description thereof will be omitted. The twist motor 221 and the vertical motor 222 of the robot 200 according to the first embodiment operate in a similar manner to those of the robot 200 disclosed in Japanese Patent Application Laid-Open No. 2023-115370.

The robot 200 includes a gyro sensor 215. The robot 200 can detect a change in posture of the robot 200 itself by the acceleration sensor 212 and the gyro sensor 215, and can detect that the robot is lifted, redirected, or thrown by a user. The robot 200 can detect illuminance around the robot 200 by the illuminance sensor 214.

At least some of the acceleration sensor 212, the microphone 213, the gyro sensor 215, the illuminance sensor 214, and the speaker 231 may be provided in the head portion 204 other than in the body portion 206, or may be provided in both the body portion 206 and the head portion 204.

Figure 3:
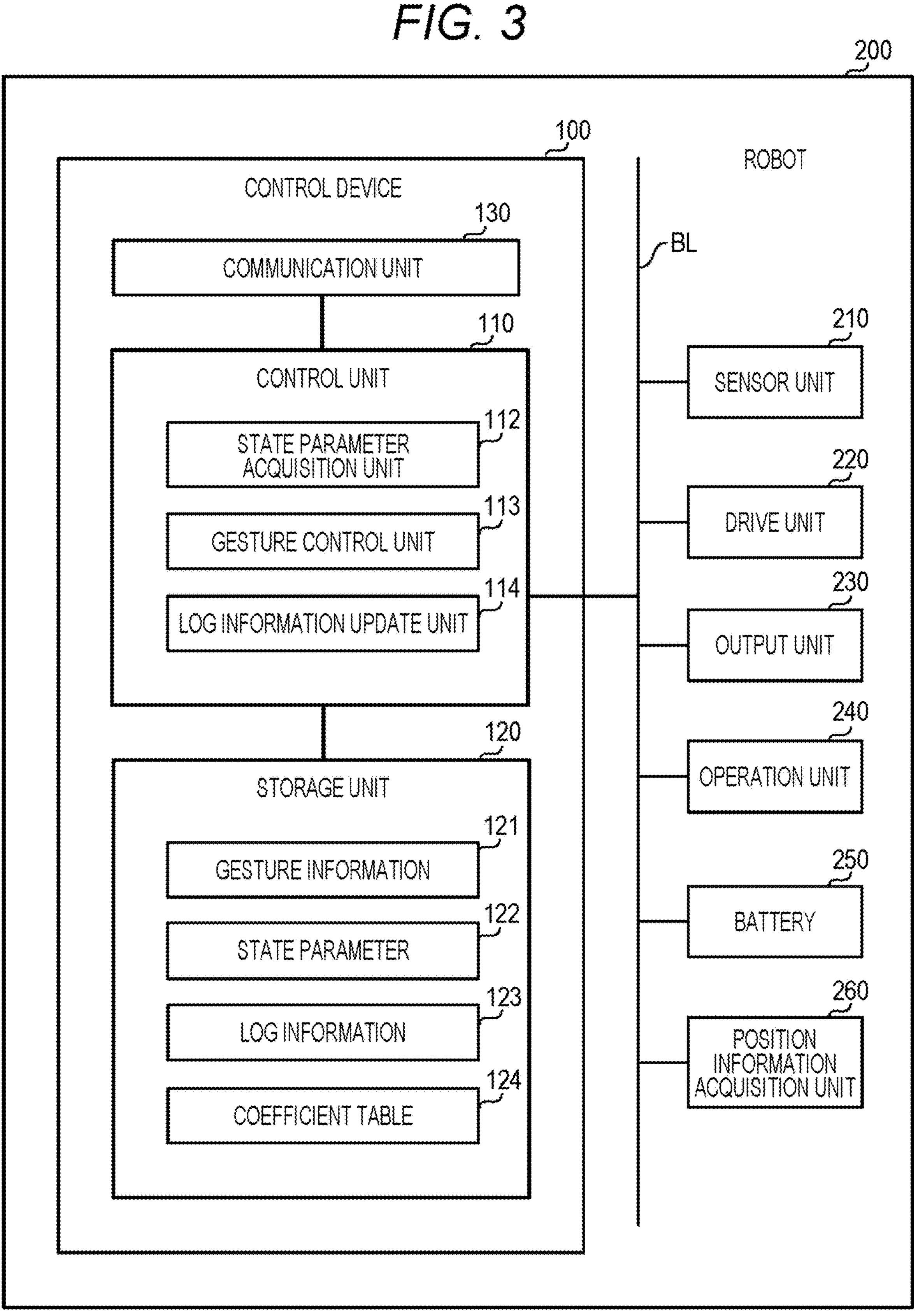
FIG. 3 is a block diagram illustrating a configuration of the robot according to the first embodiment.

Next, a functional configuration of the robot 200 will be described with reference to FIG. 3. As illustrated in FIG. 3, the robot 200 includes a control device 100, a sensor unit 210, a drive unit 220, an output unit 230, and an operation unit 240. These units 210 to 240 and the control device 100 are connected to each other via a bus line BL, for example. Instead of the bus line BL, a wired interface such as a Universal Serial Bus (USB) cable or a wireless interface such as Bluetooth (registered trademark) may be used.

The control device 100 is a device that controls the robot 200. The control device 100 includes a control unit 110, a storage unit 120, and a communication unit 130.

The control unit 110 includes a central processing unit (CPU). The CPU is, for example, a microprocessor or the like, and is a central processing unit that executes various processes and calculations. In the control unit 110, the CPU reads a control program stored in a ROM and controls the entire operation of the robot 200 that is an own device while using a RAM as a work memory. Although not illustrated, the control unit 110 has a clock function, a timer function, and the like, and can measure a date and time and the like. The control unit 110 may be referred to as a "processor".

The storage unit 120 includes the read only memory (ROM), the random access memory (RAM), a flash memory, and the like. The storage unit 120 stores programs and data used by the control unit 110 to perform various processes. The programs include an operating system (OS) and an application program. Furthermore, the storage unit 120 stores data generated or acquired by the control unit 110 performing various processes.

The communication unit 130 includes a communication interface for communicating with a device outside the robot 200. For example, the communication unit 130 communicates with an external device including the terminal device 50 according to a well-known communication standard such as a wireless local area network (LAN), Bluetooth Low Energy (BLE (registered trademark)), or near field communication (NFC).

The sensor unit 210 includes the touch sensor 211, the acceleration sensor 212, the gyro sensor 215, the illuminance sensor 214, and the microphone 213 described above. The sensor unit 210 is an example of a detection unit that detects an external stimulus.

The touch sensor 211 includes, for example, a pressure sensor or a capacitive sensor, and detects contact of any object. The control unit 110 can detect that the robot 200 is patted or hit by the user based on a detection value detected by the touch sensor 211.

The acceleration sensor 212 detects acceleration applied to the body portion 206 of the robot 200. The acceleration sensor 212 detects acceleration in each of an X-axis direction, a Y-axis direction, and a Z-axis direction, that is, acceleration in the three axes.

For example, the acceleration sensor 212 detects gravitational acceleration when the robot 200 is stationary. The control unit 110 can detect the current posture of the robot 200 based on the gravitational acceleration detected by the acceleration sensor 212. In other words, the control unit 110 can detect whether or not the housing 207 of the robot 200 is inclined with respect to the horizontal direction based on the gravitational acceleration detected by the acceleration sensor 212. In this manner, the acceleration sensor 212 functions as an inclination detection unit that detects the inclination of the robot 200.

Furthermore, in a case where the user lifts or throws the robot 200, the acceleration sensor 212 detects acceleration accompanying the movement of the robot 200 in addition to the gravitational acceleration. Therefore, the control unit 110 can detect the movement of the robot 200 by removing the component of the gravitational acceleration from the detection value detected by the acceleration sensor 212.

The gyro sensor 215 detects an angular velocity when rotation is applied to the body portion 206 of the robot 200. Specifically, the gyro sensor 215 detects angular velocities of three-axis rotation, that is, rotation about the X-axis direction, rotation about the Y-axis direction, and rotation about the Z-axis direction. By combining the detection value detected by the acceleration sensor 212 and the detection value detected by the gyro sensor 215, the motion of the robot 200 can be detected more accurately.

Note that the touch sensor 211, the acceleration sensor 212, and the gyro sensor 215 detect the intensity of the contact, the acceleration, and the angular velocities, respectively, at synchronized timing (for example, every 0.25 seconds), and output the detected values to the control unit 110.

The microphone 213 detects sound around the robot 200. The control unit 110 can detect, for example, that the user is calling to the robot 200, clapping hands, or the like, based on a component of the sound detected by the microphone 213.

The illuminance sensor 214 detects illuminance around the robot 200. The control unit 110 can detect that the surroundings of the robot 200 become brighter or darker, based on the illuminance detected by the illuminance sensor 214.

The control unit 110 acquires, as external stimuli, the detection values detected by the various sensors included in the sensor unit 210 via the bus line BL. The external stimuli are stimuli that act on the robot 200 from the outside of the robot 200. Examples of the external stimuli include "loud sound", "spoken to", "patted", "lifted", "turned upside down", "brighter", and "darker".

For example, the control unit 110 acquires, by the microphone 213, an external stimulus due to "loud sound" or "spoken to", and acquires, by the touch sensor 211, an external stimulus due to "patted". In addition, the control unit 110 acquires an external stimulus due to "lifted", "hugged", or "turned upside down" by the acceleration sensor 212 and the gyro sensor 215, and acquires an external stimulus due to "brighter" or "darker" by the illuminance sensor 214.

Note that the sensor unit 210 may include a sensor other than the touch sensor 211, the acceleration sensor 212, the gyro sensor 215, and the microphone 213. By increasing the number of types of sensors included in the sensor unit 210, the number of types of external stimuli that can be acquired by the control unit 110 can be increased.

The drive unit 220 includes the twist motor 221 and the vertical motor 222, and is driven by the control unit 110. The twist motor 221 is a servomotor for rotating the head portion 204 in the left-right direction (width direction) around the front-back direction as an axis with respect to the body portion 206. The vertical motor 222 is a servomotor for rotating the head portion 204 in the up-down direction (height direction) about the left-right direction with respect to the body portion 206. The robot 200 can express an operation of laterally twisting the head portion 204 by the twist motor 221, and can express an operation of lifting and lowering the head portion 204 by the vertical motor 222.

The output unit 230 includes the speaker 231. When the control unit 110 inputs sound data to the output unit 230, sound is output from the speaker 231. For example, when the control unit 110 inputs data of a cry of the robot 200 to the output unit 230, the robot 200 emits a pseudo cry.

Note that a display such as a liquid crystal display or a light emitting unit such as a light emitting diode (LED) may be provided as the output unit 230 instead of the speaker 231 or in addition to the speaker 231, and emotions such as joy and sadness may be displayed on the display or expressed by the color or brightness of emitted light.

The operation unit 240 includes an operation button, a volume-control knob, and the like. The operation unit 240 is, for example, an interface for receiving a user operation such as turning on and off power, adjusting the volume of output sound, and the like.

The battery 250 is a rechargeable secondary battery, and stores electric power to be used in the robot 200. The battery 250 is charged when the robot 200 moves to a charging station.

A position information acquisition unit 260 includes a position information sensor such as a global positioning system (GPS), and acquires current position information of the robot 200. Note that the position information acquisition unit 260 is not limited to the GPS, and may acquire the position information of the robot 200 by a general method using wireless communication, or may acquire the position information of the robot 200 via application software of the terminal device 50.

The control unit 110 functionally includes a state parameter acquisition unit 112 that is an example of a state parameter acquisition unit, a gesture control unit 113 that is an example of a gesture control unit, and a log information update unit 114 that is an example of a log information update unit. In the control unit 110, the CPU functions as these units by reading a program stored in the ROM into the RAM and executing and controlling the program. In the control unit 110, the single CPU is not limited to functioning as the units, and a plurality of CPUs may cooperatively function as the units. The storage unit 120 also stores gesture information 121, a state parameter 122, log information 123, and a coefficient table 124.

Figure 4:
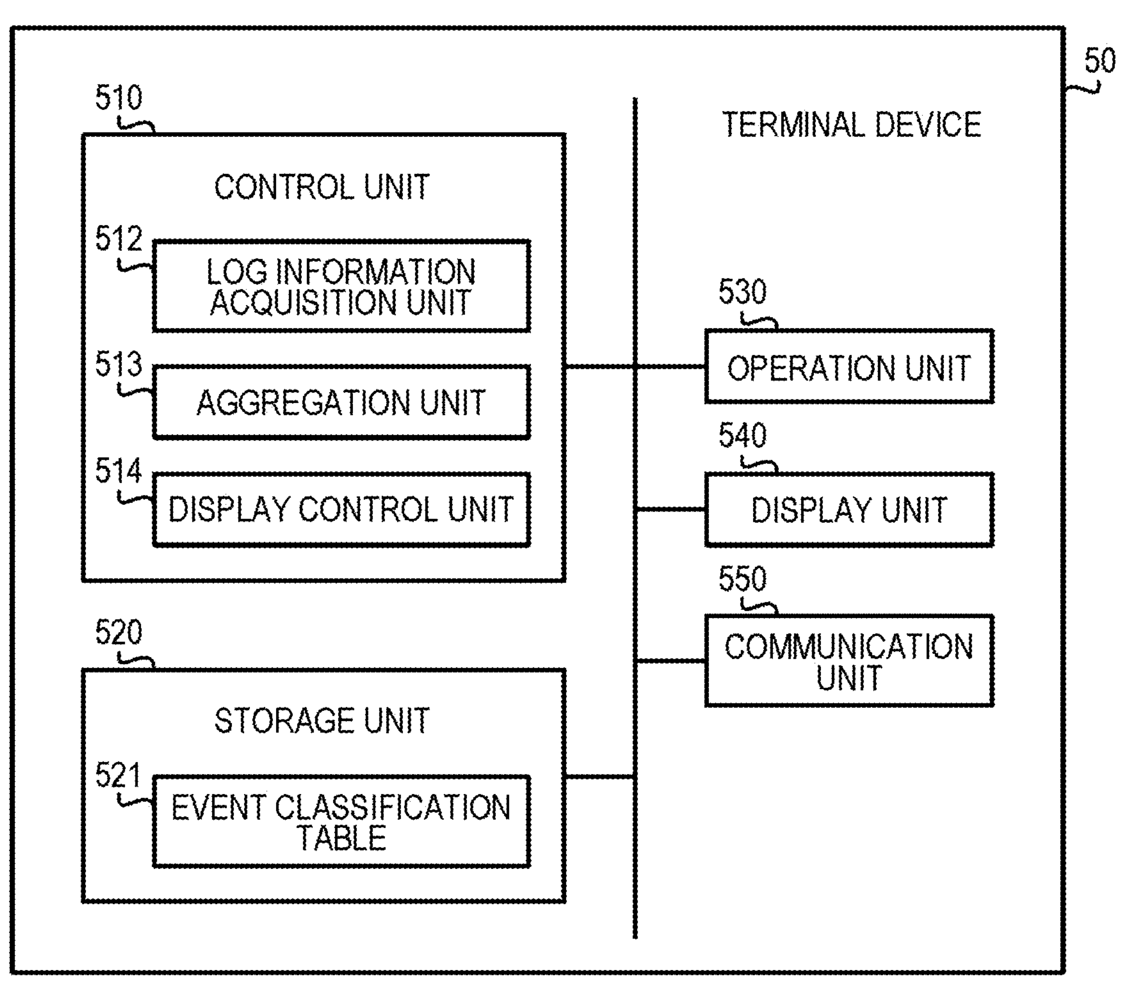
FIG. 4 is a block diagram illustrating a configuration of a terminal device according to the first embodiment.

Next, a configuration of the terminal device 50 will be described with reference to FIG. 4. The terminal device 50 is an operation terminal operated by a user. The terminal device 50 is, for example, a general-purpose information processing device such as a smartphone, a tablet terminal, or a wearable terminal. As illustrated in FIG. 4, the terminal device 50 includes a control unit 510, a storage unit 520, an operation unit 530, a display unit 540, and a communication unit 550. The terminal device 50 is an example of a display control device that displays an object related to the robot 200. The robot system 1 is an example of a display control system.

The control unit 510 includes a CPU. In the control unit 510, the CPU reads a control program stored in a ROM and controls the entire operation of the terminal device 50 while using a RAM as a work memory. The control unit 510 may be referred to as a "processor".

The storage unit 520 includes the ROM, the RAM, a flash memory, and the like. The storage unit 520 stores programs and data used by the control unit 510 to perform various processes. Furthermore, the storage unit 520 stores data generated or acquired by the control unit 510 performing various processes.

The operation unit 530 includes an input device such as a touch panel, a touch pad, or a physical button, and receives an operation input from the user.

The display unit 540 includes a display device such as a liquid crystal display, and displays various images under control by the control unit 510. The display unit 540 is an example of a display.

The communication unit 550 includes a communication interface for communicating with a device outside the terminal device 50. For example, the communication unit 550 communicates with an external device including the robot 200 according to a well-known communication standard such as a wireless LAN, BLE (registered trademark), or NFC.

The control unit 510 functionally includes a log information acquisition unit 512 which is an example of a log information acquisition unit, an aggregation unit 513 which is an example of an aggregation unit, and a display control unit 514 which is an example of a display control unit. In the control unit 510, the CPU functions as these units by reading a program stored in the ROM into the RAM and executing and controlling the program. In the control unit 510, the single CPU is not limited to functioning as the units, and a plurality of CPUs may cooperatively function as the units. In addition, the storage unit 520 stores an event classification table 521.

Returning to FIG. 3, in the control device 100 of the robot 200, the state parameter acquisition unit 112 acquires the state parameter 122. The state parameter 122 is a parameter value for representing the state of the robot 200. Specifically, the state parameter 122 includes (1) an emotion parameter, (2) a personality parameter, (3) a remaining battery level, (4) a current location, (5) the current time, and (6) the number of growth days (the number of training days).

(1) Emotion Parameter

The emotion parameter is a parameter value representing a pseudo emotion to the robot 200. The emotion parameter is expressed by coordinates (X, Y) on an emotion map 300.

Figure 5:
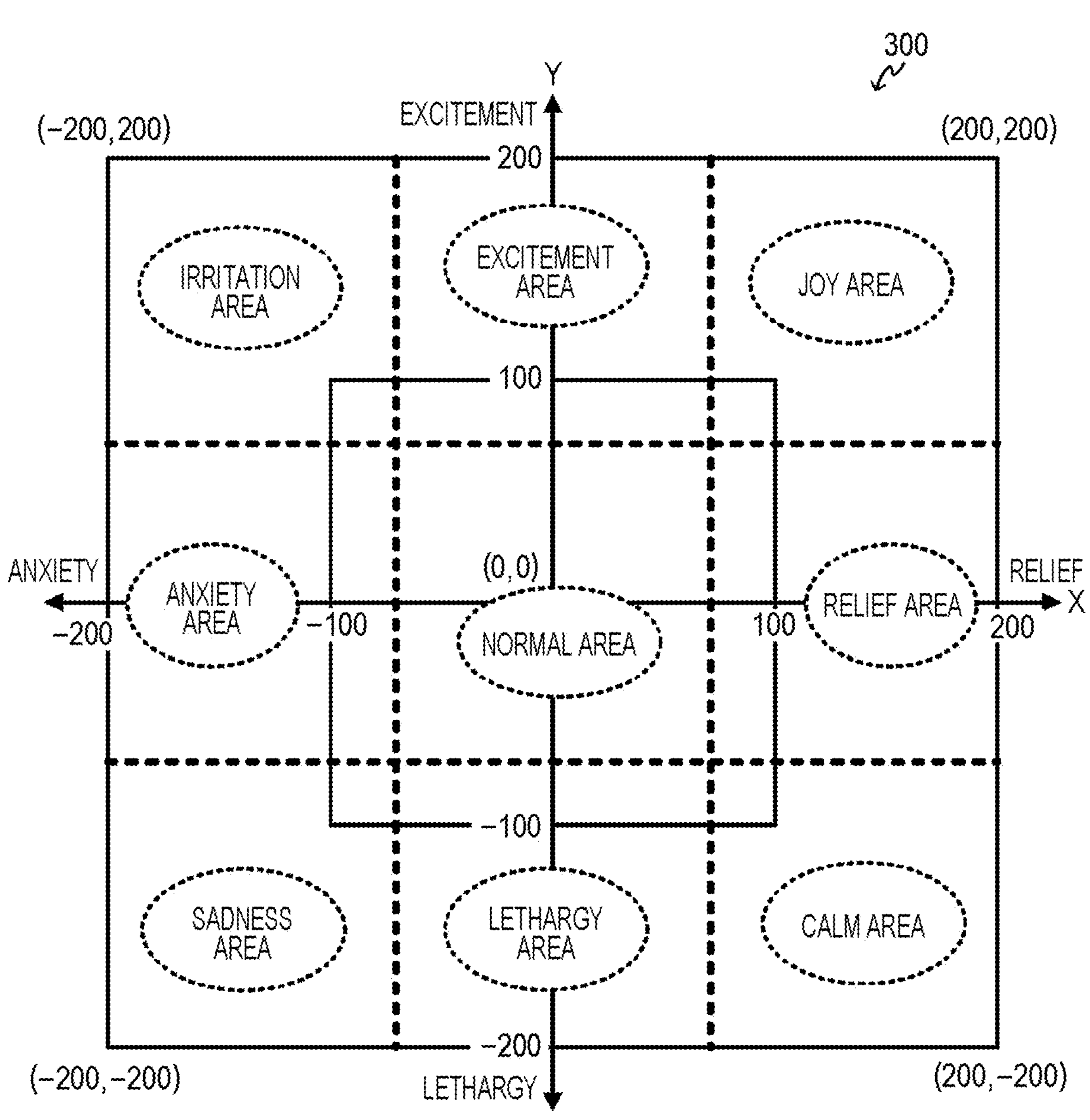
FIG. 5 is a diagram illustrating an example of an emotion map according to the first embodiment.

As illustrated in FIG. 5, the emotion map 300 is represented by a two-dimensional coordinate system having an axis indicating the degree of relief (degree of anxiety) as the X axis and an axis indicating the degree of excitement (degree of lethargy) as the Y axis. The origin (0,0) on the emotion map represents a normal emotion. The value (X value) of the X coordinate represents an emotion having a higher degree of relief as the absolute value of the value when the value is positive increases, and represents an emotion having a higher degree of anxiety as the absolute value of the value when the value is negative increases. The value (Y value) of the Y coordinate represents an emotion having a higher degree of excitement as the absolute value of the value when the value is positive increases, and represents an emotion having a higher degree of lethargy as the absolute value of the value when the value is negative increases.

The emotion parameter represents a plurality of (four in the present embodiment) pseudo emotions different from each other. In FIG. 5, among values representing the pseudo emotions, the degree of relief and the degree of anxiety are collectively represented on one axis (X axis), and the degree of excitement and the degree of lethargy are collectively represented on the other axis (Y axis). Therefore, the emotion parameter has two values, an X value (the degree of relief and the degree of anxiety) and a Y value (the degree of excitement and the degree of lethargy), and a point on the emotion map 300 represented by the X value and the Y value represents a pseudo emotion of the robot 200. The initial value of the emotion parameter is (0, 0). The emotion map 300 is divided into nine areas, which are a "joy area", a "relief area", a "calm area", an "excitement area", a "normal area", a "lethargy area", an "irritation area", an "anxiety area", and a "sadness area", according to X values and Y values. These nine areas are divided by, for example, boundary lines indicated by broken lines in FIG. 5. Note that, in FIG. 5, the emotion map 300 is represented by a two-dimensional coordinate system, but the number of dimensions of the emotion map 300 is arbitrary, and the emotion map 300 may be, for example, one-dimensional or three-dimensional.

The state parameter acquisition unit 112 calculates emotion change amounts that are change amounts for increasing or decreasing the X value and the Y value of the emotion parameter. The emotion change amounts are expressed by the following four variables.

DXP: ease of relief (ease of changing the X value in the positive direction on the emotion map)

DXM: ease of anxiety (ease of changing the X value in the negative direction on the emotion map)

DYP: ease of excitement (ease of changing the Y value in the positive direction on the emotion map)

DYM: ease of lethargy (ease of changing the Y value in the negative direction on the emotion map)

The state parameter acquisition unit 112 updates the emotion parameter by adding or subtracting a value corresponding to an external stimulus among the emotion change amounts DXP, DXM, DYP, and DYM to or from the current emotion parameter. For example, when the robot 200 is patted on the head portion 204, the pseudo emotion of the robot 200 becomes relief, and thus the state parameter acquisition unit 112 adds DXP to the X value of the emotion parameter. Conversely, when the head portion 204 is hit, the pseudo emotion of the robot 200 becomes anxiety, and thus the state parameter acquisition unit 112 subtracts DXM from the X value of the emotion parameter. What kinds of emotion change amounts are associated with various external stimuli can be arbitrarily set. An example will be described below.

The robot 200 is patted on the head portion 204 (expressing relief): $X=X+DXP$

The robot 200 is hit on the head portion 204 (expressing anxiety): $X=X-DXM$ (These external stimuli can be detected by the touch sensor 211 of the head portion 204.)

The robot 200 is patted on the body portion 206 (expressing excitement): $Y=Y+DYP$ The robot 200 is hit on the body portion 206 (expressing lethargy): $Y=Y-DYM$ (These external stimuli can be detected by the touch sensor 211 of the body portion 206.)

The robot 200 is hugged with the head up(expressing joy): $X=X+DXP$ and $Y=Y+DYP$ The robot 200 is suspended head down (expressing sadness): $X=X-DXM$ and $Y=Y-DYM$ (These external stimuli can be detected by the touch sensor 211 and the acceleration sensor 212.)

The robot 200 is called with a gentle voice (expressing calm): $X=X+DXP$ and $Y=Y-DYM$ The robot 200 is yelled with a loud voice (expressing irritation): $X=X-DXM$ and $Y=Y+DYP$ (These external stimuli can be detected by the microphone 213.)

The sensor unit 210 acquires a plurality of external stimuli of different types by the plurality of sensors. The state parameter acquisition unit 112 obtains various emotion change amounts according to each of the plurality of external stimuli, and sets the emotion parameter according to the obtained emotion change amounts.

The initial values of the emotion change amounts DXP, DXM, DYP, and DYM are 10, and increase up to 20. The state parameter acquisition unit 112 updates each of the variables of the emotion change amounts DXP, DXM, DYP, and DYM according to the external stimuli detected by the sensor unit 210. More specifically, in one day, the state parameter acquisition unit 112 adds 1 to DXP when the X value of the emotion parameter is set to the maximum value of the emotion map 300 even once, and adds 1 to DYP when the Y value of the emotion parameter is set to the maximum value of the emotion map 300 even once. Furthermore, in one day, the state parameter acquisition unit 112 adds 1 to DXM when the X value of the emotion parameter is set to the minimum value of the emotion map 300 even once, and adds 1 to DYM when the Y value of the emotion parameter is set to the minimum value of the emotion map 300 even once.

As described above, the state parameter acquisition unit 112 changes the emotion change amounts, that is, the degrees of changes in emotion by the update processing of changing the emotion change amounts according to the condition based on whether the values of the emotion parameter reach the maximum value or the minimum value of the emotion map 300. For example, when the robot 200 is patted on only the head portion 204 many times, only the emotion change amount DXP increases, and the other emotion change amounts do not change. Therefore, the robot 200 has a personality in which the robot 200 easily expresses relief. In addition, when the robot 200 is hit on only the head portion 204 many times, only the emotion change amount DXM increases, and the other emotion change amounts do not change. Therefore, the robot 200 has a personality in which the robot 200 easily expresses anxiety. As described above, the state parameter acquisition unit 112 changes the emotion change amounts according to various external stimuli.

(2) Personality Parameter

The personality parameter is a parameter value representing a pseudo personality of the robot 200. The personality parameter includes a plurality of personality values representing different personality degrees. The state parameter acquisition unit 112 changes a plurality of personality values included in the personality parameter according to external stimuli detected by the sensor unit 210.

More specifically, the state parameter acquisition unit 112 calculates four personality values in accordance with the following Equations 1. That is, a value obtained by subtracting 10 from DXP indicating ease of relief is set as a personality value (happy), a value obtained by subtracting 10 from DXM indicating ease of anxiety is set as a personality value (shy), a value obtained by subtracting 10 from DYP indicating ease of excitement is set as a personality value (active), and a value obtained by subtracting 10 from DYM indicating ease of lethargy is set as a personality value (wanted).

The personality value (happy)$=DXP-10$

The personality value (shy)$=DXM-10$

The personality value (active)$=DYP-10$

The personality value (wanted)$=DYM-10$ (Equations 1)

Figure 6:
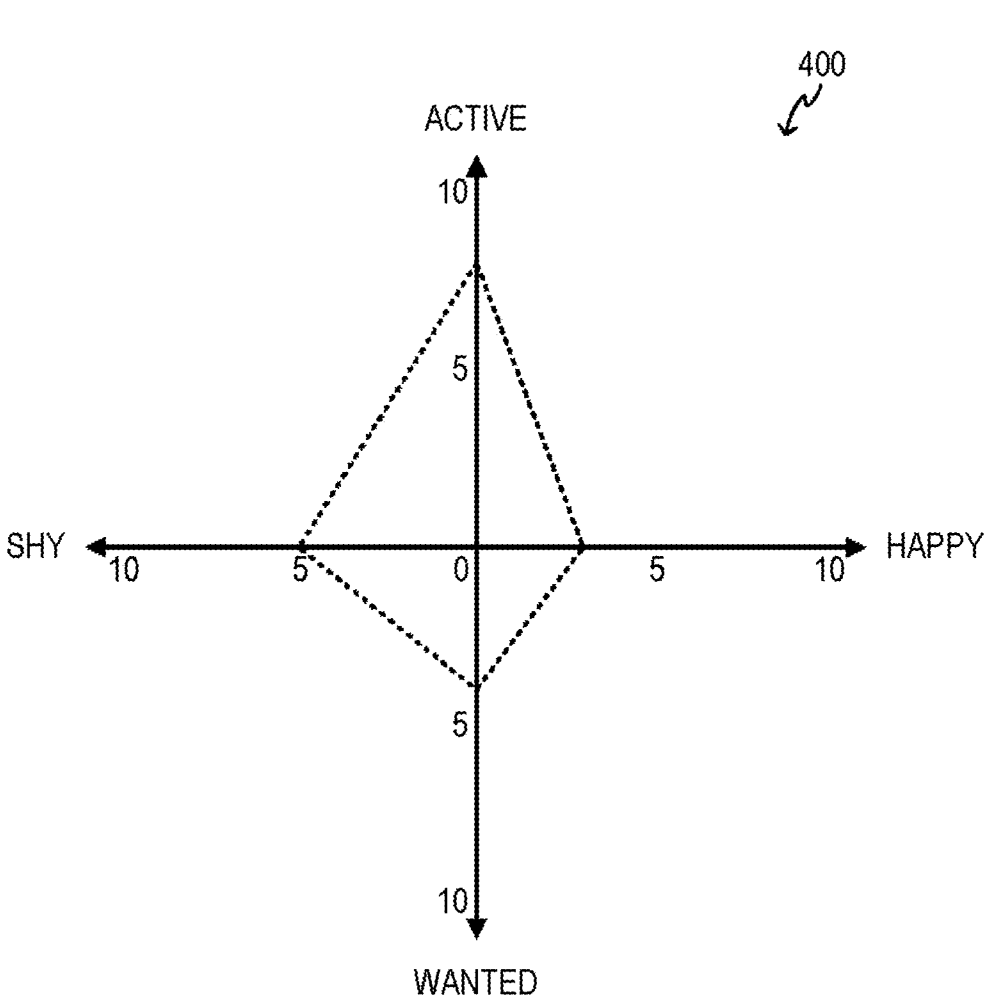
FIG. 6 is a diagram illustrating an example of a personality value radar chart according to the first embodiment.

As a result, as illustrated in FIG. 6, a personality value radar chart 400 can be generated by plotting the personality value (happy) on the first axis, the personality value (active) on the second axis, the personality value (shy) on the third axis, and the personality value (wanted) on the fourth axis. Since each of the variables of the emotion change amounts has an initial value of 10 and increases up to 20, a range of each of the personality values is 0 or more and 10 or less.

Since the initial value of each personality value is 0, the personality at the birth of the robot 200 is represented by the origin of the personality value radar chart 400. Then, as the robot 200 grows, the four personality values change with 10 as the upper limit according to external stimuli or the like detected by the sensor unit 210 (how the user treats the robot 200). Thus, 11 to the power of 4=14641 personalities can be expressed. As described above, the robot 200 has various personalities depending on how the user treats the robot 200. That is, the personality of the robot 200 is formed differently depending on how the user treats the robot 200.

The four personality values are fixed when the pseudo growth of the robot 200 is completed after the lapse of a child period. In order to correct the personality also in a subsequent adult period in accordance with how the user treats the robot 200, the state parameter acquisition unit 112 adjusts four personality correction values (happy correction value, active correction value, shy correction value, and wanted correction value).

The state parameter acquisition unit 112 adjusts the four personality correction values in accordance with a condition based on which of the nine divided areas an area in which the emotion parameter is present on the emotion map 300 for the longest period. As an example, in a case where the area in which the emotion parameter is present for the longest period is the relief area on the emotion map 300, the state parameter acquisition unit 112 adds 1 to the happy correction value and subtracts 1 from the shy correction value. Furthermore, in a case where the area in which the emotion parameter is present for the longest period is the excitement area on the emotion map 300, the state parameter acquisition unit 112 adds 1 to the active correction value and subtracts 1 from the wanted correction value. Note that, also in a case where the area in which the emotion parameter is present for the longest period is another area, the state parameter acquisition unit 112 similarly adjusts the four personality correction values according to the area.

After setting the four personality correction values, the state parameter acquisition unit 112 calculates the four personality values in accordance with the following Equations 2.

The personality value (happy)=$DXP-10$+the happy correction value

The personality value (shy)=$DXM-10$+the shy correction value

The personality value (active)=$DYP-10$+the active correction value

The personality value (wanted)=$DYM-10$+the wanted correction value (Equations 2)

(3) Remaining Battery Level

The remaining battery level is a remaining amount of power stored in the battery 250, and is a parameter value representing a pseudo degree of hunger of the robot 200. The state parameter acquisition unit 112 acquires information of the current remaining battery level by a power supply control unit that controls charging and discharging of the battery 250.

(4) Current Location

The current location is a location where the robot 200 is currently located. The state parameter acquisition unit 112 acquires information of the current position of the robot 200 by the position information acquisition unit 260. Specifically, the state parameter acquisition unit 112 refers to past position information of the robot 200 to determine whether the current location is a home, the current location is a place where the robot 200 is located for the first time, a familiar place, or an unfamiliar place. Then, the state parameter acquisition unit 112 acquires information of the determination as the current location.

(5) Current Time

The current time is a current time in a predetermined country. The state parameter acquisition unit 112 acquires the current time by a clock installed in the robot 200. More specifically, the state parameter acquisition unit 112 refers to a log of ON/OFF of pseudo sleep of the robot 200, and determines whether the current time is immediately after a wake-up time, immediately before a bedtime, or corresponds to a nap time zone.

(6) Number of Days of Growth (Number of Days of Training)

The number of days of growth represents the number of days of pseudo growth of the robot 200. The robot 200 is born in a pseudo manner at the time of the first activation by the user after shipment from a factory, and grows from a child to an adult over a predetermined growth period (for example, 50 days). The number of days of growth corresponds to the number of days from the pseudo birth of the robot 200. The growth period is referred to as a "child period", and a period after the completion of the child period is referred to as an "adult period".

During the child period, the state parameter acquisition unit 112 increases both the maximum value and the minimum value of the emotion map 300 by 2 every time the number of days of pseudo growth of the robot 200 increases by one day. Initial values of the size of the emotion map 300 are a maximum value of 100 for both the X value and the Y value and a minimum value of −100 for both the X value and the Y value. When a half (for example, 25 days) of the child period has elapsed, both the X value and the Y value have a maximum value of 150 and a minimum value of −150. When the child period elapses, the pseudo growth of the robot 200 stops. At this time, both the X value and the Y value have a maximum value of 200 and a minimum value of −200. Thereafter, the size of the emotion map 300 is fixed.

A settable range of the emotion parameter is defined by the emotion map 300. Therefore, as the size of the emotion map 300 increases, the range of the emotion parameter that can be set increases. The increase in the settable range of the emotion parameter enables richer emotion expression, so that the pseudo growth of the robot 200 is expressed by the increase in the size of the emotion map 300.

Returning to FIG. 3, the gesture control unit 113 causes the robot 200 to execute various gestures according to the situation based on the gesture information 121. The gesture information 121 is information that defines the gestures executed by the robot 200. Here, the gestures are behaviors, actions, or the like of the robot 200. Specifically, as illustrated in FIG. 7, the gestures include "lowering the head", "chirping", "shaking the head", "expressing surprise", "expressing joy", "expressing sadness", and the like. Furthermore, in addition to the gestures illustrated in FIG. 7, for example, various gestures such as "laughing", "expressing anger", "sneezing", "breathing", and the like can be exemplified. Each gesture is configured by a combination of a plurality of elements including an operation or a voice output.

The operation means a physical movement (motion) of the robot 200 executed by the drive of the drive unit 220. Specifically, the operation corresponds to moving the head portion 204 with respect to the body portion 206 by the twist motor 221 or the vertical motor 222. The voice output means that various voices such as a cry are output from the speaker 231 of the output unit 230.

As illustrated in FIG. 7, the gesture information 121 defines a gesture control parameter for each of the plurality of gestures that can be executed by the robot 200. The gesture control parameters are parameter values for causing the robot 200 to execute the respective gestures. The gesture control parameters define, for each of elements forming the gestures, an operation parameter or a cry parameter and a time (milliseconds) for executing the element. The operation parameter defines an operation angle of the twist motor 221 and an operation angle of the upper and vertical motor 222. The cry parameter defines a voice and a volume.

As an example, to cause the robot 200 to execute a gesture of "lowering the head", the gesture control unit 113 first controls the twist motor 221 and the vertical motor 222 such that the angles of the twist motor 221 and the vertical motor 222 become 0 degrees after 100 milliseconds, and controls the angle of the vertical motor 222 to become-45 degrees after 100 milliseconds after that. To cause the robot 200 to execute a gesture of "chirping", the gesture control unit 113 outputs a "peep" voice at a volume of 60 dB from the speaker 231 for 300 milliseconds. To cause the robot 200 to execute a gesture of "shaking the head", the gesture control unit 113 first controls the twist motor 221 and the vertical motor 222 such that the angles of the twist motor 221 and the vertical motor 222 becomes 0 degrees after 100 milliseconds, and controls the drive unit 220 such that the angle of the twist motor 221 becomes 34 degrees after 100 milliseconds after that and the angle of the twist motor 221 becomes-34 degrees after 100 milliseconds after that.

Furthermore, the gesture information 121 illustrated in FIG. 7 defines gestures such as "expressing surprise", "expressing joy", and "expressing sadness" as more complicated gestures. To cause the robot 200 to execute a gesture of "expressing surprise", the gesture control unit 113 first controls the twist motor 221 and the vertical motor 222 such that the angles of the twist motor 221 and the vertical motor 222 are 0 degrees after 100 milliseconds, and controls the angle of the vertical motor 222 to be −24 degrees after 100 milliseconds after that. Then, the gesture control unit 113 does not rotate the twist motor 221 and the vertical motor 222 for 700 milliseconds after that, and controls the angle of the twist motor 221 to be 34 degrees and the angle of the vertical motor 222 to be −24 degrees after 500 milliseconds after that. Then, the gesture control unit 113 controls the angle of the twist motor 221 to be −34 degrees after 400 milliseconds, and controls the angle of the twist motor 221 and the vertical motor 222 to be 0 degrees after 500 milliseconds after that. In parallel with the driving of the twist motor 221 and the vertical motor 222, the gesture control unit 113 outputs a "squeal" voice at a volume of 70 dB from the speaker 231. Note that, in FIG. 7, gesture control parameters for gestures of "expressing joy" and "expressing sadness" are omitted, but are determined by a combination of an operation (motion) by the twist motor 221 or the vertical motor 222 and a voice output (cry) from the speaker 231, similarly to the gesture of "expressing surprise".

The gesture information 121 determines a gesture to be executed by the robot 200 by such a combination of a motion and a voice output (cry). The gesture information 121 may be incorporated in the robot 200 in advance. Alternatively, the gesture information 121 may be freely created by the user operating the terminal device 50.

The gestures defined in the gesture information 121 are associated in advance with triggers that are conditions for the robot 200 to execute the gestures. Specifically, the triggers can be various conditions such as "patted", "spoken to", "shaken", "hugged", "hit", "yelled", "turned upside down", "brighter", "darker", and the like.

These triggers are triggers based on external stimuli and are detected by the sensor unit 210. For example, "spoken to" and "yelled" are detected by the microphone 213. "Patted" and "hit" are detected by the touch sensor 211. "Shaken", "hugged", and "turned upside down" are detected by the acceleration sensor 212 or the gyro sensor 215. The "brighter" and the "darker" are detected by the illuminance sensor 214. Note that the triggers may not be based on external stimuli, and may include "a specific time has arrived", "the robot 200 has moved to a specific place", and the like.

More specifically, the gesture control unit 113 determines "spoken to" when a relatively small voice is detected by the microphone 213, and determines "yelled" when a relatively large voice is detected by the microphone 213. In addition, the gesture control unit 113 determines "patted" when a relatively small value is detected by the touch sensor 211, and determines "hit" when a relatively large value is detected by touch sensor 211. Furthermore, the gesture control unit 113 determines "gently shaken", "strongly shaken", "hugged", or "turned upside down" based on a detection value detected by the acceleration sensor 212 or the gyro sensor 215.

The gesture control unit 113 determines whether any trigger among the triggers for the plurality of gestures defined in the gesture information 121 is established based on a result or the like of detection by the sensor unit 210. As a result of the determination, when any of the triggers is established, the robot 200 is caused to execute a gesture associated with the established trigger. As described above, the gesture control unit 113 causes the robot 200 to execute the various gestures in accordance with the establishment of the triggers. As a result, for example, the robot 200 can interact with the user such as executing a gesture of crying in response to a call from the user, executing a gesture of expressing joy when being patted by the user, executing a gesture of rejecting when being turned upside down by the user, . . . , and the like. The establishment of some trigger for the robot 200 to execute a gesture is referred to as an "event".

More specifically, the gesture control unit 113 corrects a gesture control parameter specified from the gesture information 121 based on the state parameter 122 acquired by the state parameter acquisition unit 112. As a result, the gesture can be changed according to the current state of the robot 200, and the robot 200 can realistically simulate living things.

In order to correct the gesture control parameter, the gesture control unit 113 refers to the coefficient table 124. Although not illustrated, the coefficient table 124 defines various different correction coefficients for each state that the robot 200 can take. The gesture control unit 113 corrects the gesture control parameter using a correction coefficient corresponding to the current state of the robot 200 indicated by the state parameter 122 acquired by the state parameter acquisition unit 112. Specifically, the gesture control unit 113 changes the time for executing each element forming the gesture, the operation angles defined by the operation parameter, the volume of the cry parameter, and the like with reference to a value in the gesture information 121. As a result, the motion of the robot 200 becomes quick or slow, the motion becomes large or small, and the cry becomes large or small.

As described above, the gesture control unit 113 corrects the gesture control parameter based on the state parameter 122 acquired by the state parameter acquisition unit 112. Then, the gesture control unit 113 drives the drive unit 220 based on the corrected gesture control parameter or outputs a voice from the speaker 231 to cause the robot 200 to execute the gesture associated with the established trigger. By correcting the gesture control parameter based on the state parameter 122, even in a case where the robot 200 executes the same gesture, a gesture to be executed according to the current state (the emotion, the personality, the remaining battery level, the current location, the current time, and the like) of the robot 200 varies. For example, even in a case where the robot 200 executes the same gesture of "expressing joy", gestures to be executed are different in a case where the pseudo emotion corresponds to "joy" and a case where the pseudo emotion corresponds to "irritation". As a result, the gestures are not uniform, and individuality can be expressed.

Returning to FIG. 3, the log information update unit 114 updates the log information 123. The log information 123 is information in which a log (history) of a parameter value related to the robot 200, which is an electronic device that executes a gesture corresponding to an event (establishment of a trigger), is recorded.

The log information 123 records a log of a parameter related to the robot 200 that executes various gestures when such an event occurs. The parameter values are values that change according to an event. Specifically, the parameter value includes the number of occurrences of an event, an emotion parameter indicating a pseudo emotion of the robot 200, a personality parameter indicating a pseudo personality of the robot 200, and information regarding pseudo sleep of the robot 200.

As illustrated in FIG. 8, the log information 123 records the emotion parameter, the personality parameter, the number of occurrences of an event, the remaining battery level, and ON/OFF of sleep in association with each other every 10 minutes. Specifically, the log information 123 records an X value and a Y value on the emotion map 300 as the emotion parameter, and records the above-described four personality values as the personality parameter. The log information 123 records the number of occurrences of an event for each established trigger.

Every time a predetermined time period (for example, 10 minutes) elapses, the log information update unit 114 records the number of occurrences of an event during the time period in the log information 123 for each trigger, and further records the emotion parameter, the personality parameter, the remaining battery level, and ON/OFF of sleep at the end of the time period in the log information 123. As a result, the log information update unit 114 accumulates the log information 123.

Returning to FIG. 4, in the terminal device 50, the log information acquisition unit 512 acquires the log information 123 updated by the log information update unit 114. When a predetermined acquisition timing arrives, the log information acquisition unit 512 communicates with the control device 100 of the robot 200 via the communication unit 550 to acquire the log information 123. The acquisition timing of the log information 123 may be a periodic timing such as once a day, or may be an appropriate timing at which the log information 123 is required.

For example, the log information acquisition unit 512 requests the log information 123 from the robot 200 at a timing when the user inputs, to the terminal device 50, an operation of displaying a diary screen, which is a record of interaction with the robot 200. As a response to the request, the log information update unit 114 transmits the latest log information 123 stored in the storage unit 120 to the terminal device 50. The log information update unit 114 is not limited to transmitting all the log information 123 stored in the storage unit 120 to the terminal device 50, and may transmit differential data with the log information 123 transmitted to the terminal device 50 in the past. The log information acquisition unit 512 acquires the log information 123 transmitted from the robot 200 in this manner.

The aggregation unit 513 generates aggregate data of the acquired parameter values in a target period based on the log information 123 acquired by the log information acquisition unit 512. Here, the aggregate data of the parameter values in the target period is information in which a change amount, transition, cumulative value, and the like of each of the parameter values in the target period are put together. The aggregate data may be statistical information such as an average value, a maximum value, a minimum value, or the like of the parameter values in the target period. The aggregation unit 513 aggregates the data recorded in the target period for each of the plurality of parameter values recorded in the log information 123 to generate the aggregate data.

The target period is a period for which the parameter values are to be aggregated, and is specifically a period such as one day, one week, one month, or one year. The aggregation unit 513 generates aggregate data of the parameter values in each of a plurality of target periods having different time lengths. As an example, a case where the aggregation unit 513 generates aggregate data for each of three target periods having different time lengths of the past one week from the current point of time, the past one month from the current point of time, and the past one year from the current point of time (week, month, year) will be described below.

First, the aggregation unit 513 generates information indicating a pseudo emotion of the robot 200 in each of the target periods as aggregate data of the emotion parameter. More specifically, the aggregation unit 513 refers to the log information 123 to calculate a ratio of a time length in which the X value and the Y value of the emotion parameter in each of the target periods are positioned in each of the nine areas on the emotion map 300. The nine areas are the "joy area", the "relief area", the "calm area", the "excitement area", the "normal area", the "lethargy area", the "irritation area", the "anxiety area", and the "sadness area" divided on the emotion map 300.

For each of the nine emotions corresponding to these areas, the aggregation unit 513 calculates the ratio of the time length of the emotion held by the robot 200 in each of the past one week, the past one month, and the past one year. In this manner, the aggregation unit 513 generates aggregate data of the emotion parameter in each of the target periods of the week, the month, and the year.

Secondly, the aggregation unit 513 generates information indicating the pseudo personality of the robot 200 in each of the target periods as the aggregate data of the personality parameter. More specifically, the aggregation unit 513 acquires, from the log information 123, four personality values of "happy", "active", "shy", and "wanted" at the respective final time points of each day of the past one week, each week of the past one month, and each month of the past one year. In this manner, the aggregation unit 513 generates aggregate data of the personality parameter in each of the target periods of the week, the month, and the year.

Thirdly, the aggregation unit 513 generates information indicating the time of pseudo sleep of the robot 200 in the target periods as aggregate data of sleep information. More specifically, the aggregation unit 513 refers to the log information 123 and obtains the sleep time in each of the target periods for each day from information of ON/OFF of sleep in the target periods. The sleep time corresponds to a time length during which a sleep field continuously indicates ON in the log information 123. In this case, for example, in a case where the robot 200 takes pseudo sleep, such as a nap and going to bed at night, a plurality of times a day, the aggregation unit 513 obtains the longest time among the plurality of times of sleep as the sleep time of the day.

Specifically, the aggregation unit 513 obtains the sleep time in each day of the past one week from the log information 123, and further calculates the average value of the sleep time in the past one week. The aggregation unit 513 calculates the average value of the sleep time in each week of the past one month, and further calculates the average value of the sleep time in the past one month. The aggregation unit 513 calculates an average value of the sleep time in each month in the past one year, and further calculates an average value of the sleep time in the past one year. In this manner, the aggregation unit 513 generates aggregate data of the sleep time in each target period of the week, the month, and the year.

Fourth, the aggregation unit 513 generates information indicating the number of occurrences of an event in each of the target periods for each type as aggregate data of the number of occurrences of an event. More specifically, the aggregation unit 513 acquires the number of occurrences of an event for each trigger from the log information 123, and counts the number of occurrences of the event for each trigger in each day of the past one week, each week of the past one month, and each month of the past one year. In this manner, the aggregation unit 513 generates the aggregate data of the number of occurrences of an event for each trigger in each target period of the week, the month, and the year.

Further, the aggregation unit 513 refers to the event classification table 521 and classifies the number of occurrences of an event in each of the target periods for each type. As illustrated in FIG. 9, the event classification table 521 classifies a plurality of events that may occur into the first type, the second type, and other types according to the trigger.

The first type of event is an event that causes the robot 200 to have a pseudo positive emotion. Here, the robot 200 having the pseudo positive emotion means that the robot 200 expresses joy in a pseudo manner, and specifically corresponds to an increase in the emotion change amount DXP indicating ease of relief on the emotion map 300. The first type of event corresponds to, for example, an event caused by a trigger such as "patted", "spoken to", "gently shaken", or "hugged". The positive emotion is an example of a predetermined first emotion.

In contrast, the second type of event is an event that causes the robot 200 to have a second emotion that is a pseudo negative emotion. The robot 200 having the pseudo negative emotion means that the robot 200 rejects in a pseudo manner, and specifically corresponds to an increase in the emotion change amount DXM indicating ease of anxiety on the emotion map 300. The second type of event corresponds to, for example, an event caused by a trigger such as "hit", "yelled", "strongly shaken", or "turned upside down". The negative emotion is an example of a second emotion different from the first emotion.

The other types of events are events other than the events described above. The other types of events correspond to, for example, "brighter", "darker", "specific time has arrived", "moving to a specific place", and the like.

The aggregation unit 513 refers to the event classification table 521 and classifies the number of occurrences of an event for each trigger acquired from the log information 123 into the first type, the second type, and other types. Then, the aggregation unit 513 counts the number of occurrences of the first type of event, the number of occurrences of the second type of event, and the number of occurrences of other types of events in each day of the past one week, each week of the past one month, and each month of the past one year. In this manner, the aggregation unit 513 generates aggregate data of the number of occurrences of an event for each type in each target period of a week, a month, and a year.

Fifth, the aggregation unit 513 generates a "good relationship point" as aggregate data of the number of occurrences of an event in each of the target periods. Here, the good relationship point is an example of a value indicating the relationship between the user and the robot 200, and is an index indicating whether or not the relationship between the user and the robot 200 is good. As an example, the initial value of the good relationship point is 0, and increases or decreases in accordance with the following Equation 3.

The good relationship point=the number of occurrences of the first type of event×10 points−the number of occurrences of the second type of event×5 points+an additional point based on the number of elapsed days (Equation 3)

Specifically, the good relationship point increases as the number of occurrences of an event (the number of occurrences of the first type of event) that causes the robot 200 to have a pseudo positive emotion increases, and decreases as the number of occurrences of an event (the number of occurrences of the second type of event) that causes the robot 200 to have a pseudo negative emotion increases. In other words, the good relationship point increases as the number of occurrences of an event that causes the robot 200 to express joy in a pseudo manner increases, and decreases as the number of occurrences of an event that causes the robot 200 to reject in a pseudo manner increases.

The additional point based on the number of elapsed days in Equation 3 is a bonus point added according to the number of days the user spent with the robot 200. As an example, the additional point based on the number of elapsed days is added to the good relationship point every time a predetermined number of days such as 7 days, 30 days, or 90 days elapses. In this way, by adding the good relationship point according to the elapsed time, it can be expressed that the reliability increases as the period in which the user and the robot 200 spend together increases.

In this manner, the good relationship point changes according to the content of the interaction between the user and the robot 200 and the elapsed days. The aggregation unit 513 calculates the good relationship point based on the number of occurrences of the first type of event, the number of occurrences of the second type of event, and the number of elapsed days in each of the target periods.

Specifically, the aggregation unit 513 calculates a change amount and a cumulative value of the good relationship point for each day of the past week, each week of the past month, and each month of the past year. Furthermore, the aggregation unit 513 calculates a maximum value, a minimum value, and an average value of the calculated change amounts of the good relationship point in each of the target periods of the week, the month, and the year. In this manner, the aggregation unit 513 generates the aggregate data of the good relationship point in each of the target periods of the week, the month, and the year.

Here, the amount of change in the good relationship point in a certain period increases as the number of occurrences of an event that causes the robot 200 to express joy in the period increases, and decreases as the number of occurrences of an event that causes the robot 200 to reject increases. Furthermore, the cumulative value of the good relationship point in a certain period corresponds to the value of the good relationship point at the last point of time in the period. The cumulative value of the good relationship point can be used as an index indicating a cumulative relationship between the user and the robot 200.

Returning to FIG. 4, the display control unit 514 displays the aggregate data generated by the aggregation unit 513 on the display unit 540. In a case where the user desires to check a record of the interaction with the robot 200, the user operates the operation unit 530 to input an operation of displaying the diary screen. In this case, the display control unit 514 causes the display unit 540 to display the diary screen illustrated in FIG. 10.

Figure 10:
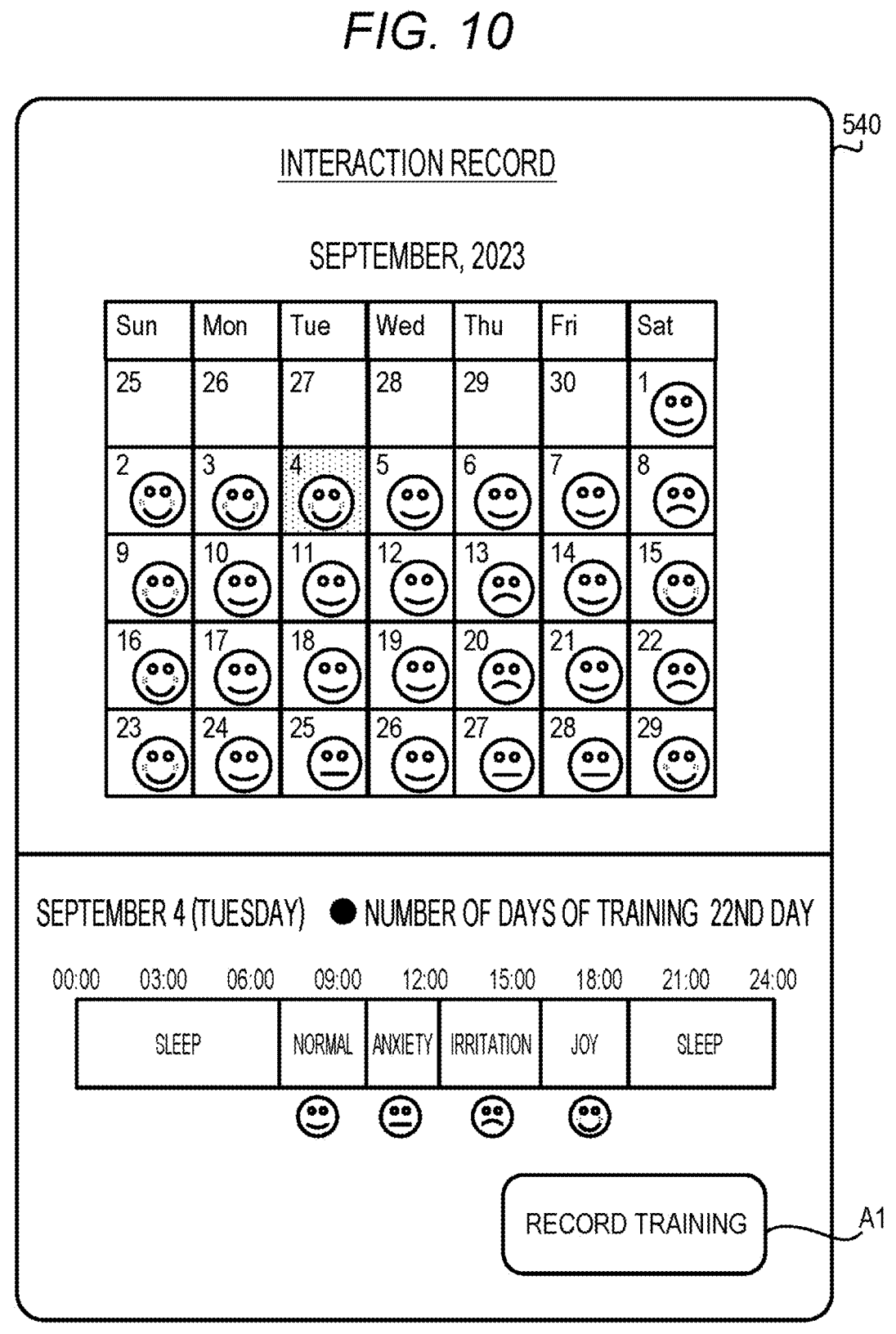

In the diary screen illustrated in FIG. 10, the display control unit 514 displays a plurality of regions corresponding to a plurality of days in a calendar format. The display control unit 514 displays an icon having a face shape in each of the plurality of regions. The expression of each icon represents a pseudo emotion of the robot 200 on the corresponding day. Specifically, the expression of each icon represents the emotion corresponding to the area in which the emotion parameter on the corresponding day is located longest on the emotion map 300.

Furthermore, the display control unit 514 further displays information indicating the transition of the pseudo emotion of the robot 200 on the diary screen. Specifically, when the user operates the operation unit 530 to select any one of the plurality of days displayed on the diary screen, the display control unit 514 displays a graph indicating a pseudo emotion of the robot 200 at each time of the selected day in a lower region of the diary screen as illustrated in FIG. 10. As a result, the user can easily check a change in the pseudo emotion of the robot 200 on the selected day. Information regarding the emotion on each day and each time can be obtained from the X value and the Y value of the emotion parameter recorded in the log information 123.

Figure 11:
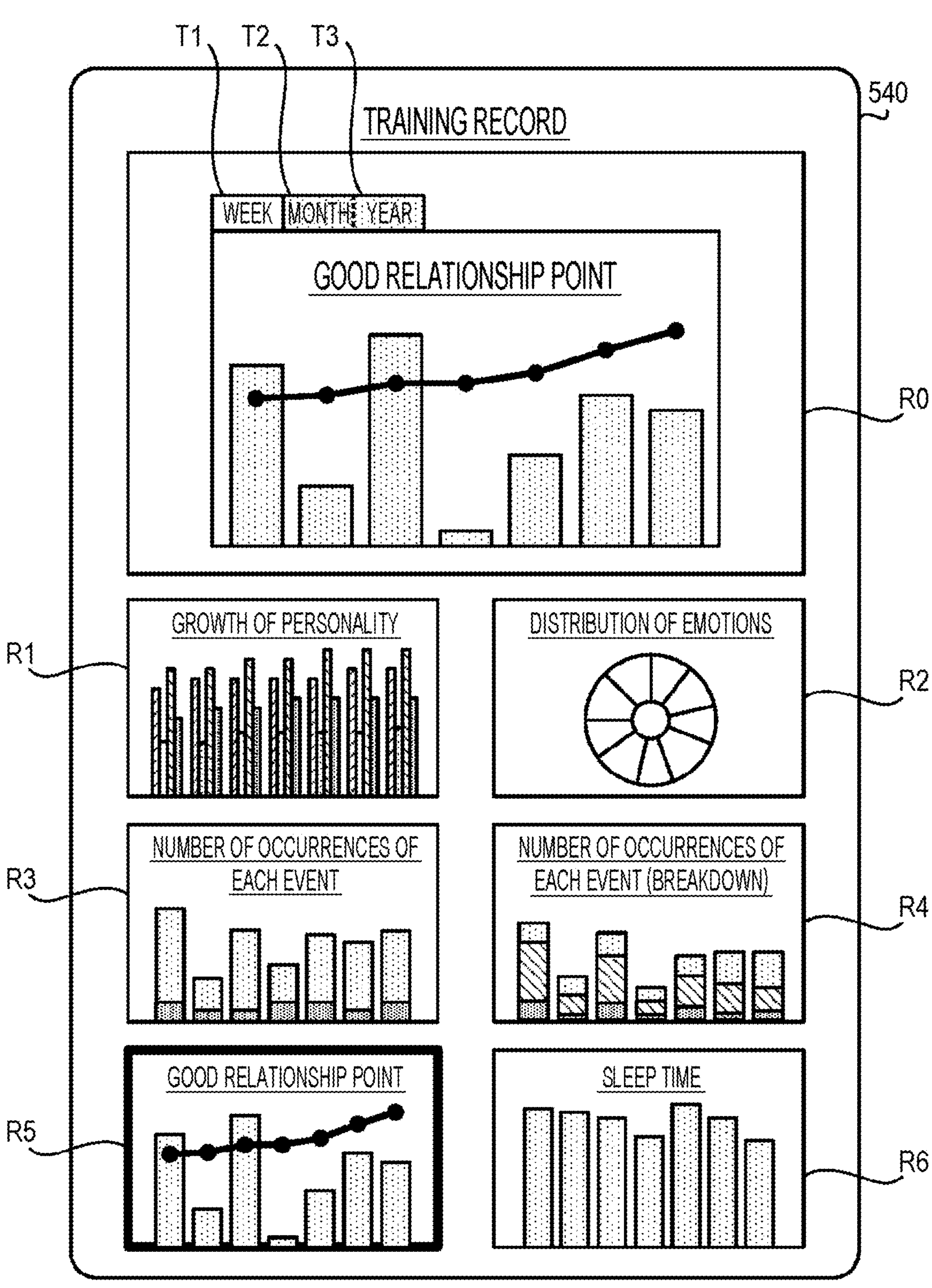
FIG. 11 is a diagram illustrating a display example of an aggregation screen according to the first embodiment.

When the user selects an icon A1 of "record training" on the diary screen, the display control unit 514 displays an aggregation screen illustrated in FIG. 11 on the display unit 540. On the aggregation screen, the display control unit 514 displays the aggregate data of each parameter value generated by the aggregation unit 513.

The aggregation screen has one main region R0 and six sub-regions R1 to R6. The display control unit 514 displays aggregate data of the individual parameter values in the sub-regions R1 to R6. Specifically, the display control unit 514 displays the aggregate data of the personality parameter in the sub-region R1, displays the aggregate data of the emotion parameter in the sub-region R2, displays the aggregate data of the number of occurrences of an event in the sub-regions R3 and R4, displays the aggregate data of the good relationship point in the sub-region R5, and displays the aggregate data of the sleep time in the sub-region R6. Details of the aggregate data of these individual parameter values will be described later.

By providing the plurality of sub-regions R1 to R6 in one screen in this manner, the user can simultaneously check the aggregate data of the plurality of parameter values. Therefore, the user can easily check the state of the growth of the robot 200 from various viewpoints.

The main region R0 is a region for displaying aggregate data displayed in one of the sub-regions R1 to R6 in a size larger than that of each of the sub-regions. The user selects a sub-region (sub-region R5 in the example of FIG. 11) displaying aggregate data of a parameter value desired to be checked in more detail from among the sub-regions R1 to R6. Then, the display control unit 514 displays the aggregate data displayed in the one sub-region selected by the user in the main region R0. Since the size of the main region R0 is larger than the size of each of the sub-regions, by displaying the aggregate data in the main region R0, it is possible to check in more detail than in each of the sub-regions.

The display control unit 514 displays aggregate data in a target period selected by the user from among the plurality of target periods in main region R0. Specifically, tabs T1 to T3 for switching the target periods, that is, a tab T1 for "week", a tab T2 for "month", and a tab T3 for "year", are provided in the main region R0.

When the user selects (taps) the week tab T1, the display control unit 514 displays aggregate data for the past one week from the current time point in the main region R0. When the user selects the month tab T2, the display control unit 514 displays aggregate data for the past one month from the current point of time in the main region R0. When the user selects the year tab T3, the display control unit 514 displays aggregate data for the past one year from the current point of time in the main region R0. In this manner, by the user operating the tabs T1 to T3, it is possible to easily switch aggregate data in different target periods such as a week, a month, and a year.

When the user operates the tabs T1 to T3 to switch the target period, the display control unit 514 is not limited to switching the target period of only the aggregate data displayed in the main region R0, and may simultaneously switch the target period of all the aggregate data displayed in the main region R0 and the six sub-regions R1 to R6 to the selected target period. Specifically, when the user selects the week tab T1, the display control unit 514 switches the target period of the aggregate data displayed in the main region R0 to the past one week, and also switches the target period of the aggregate data of the individual parameter values displayed in each of the sub-regions R1 to R6 to the past one week. The same applies to a case where the user selects the month tab T2 and a case where the user selects the year tab T3. As described above, by simultaneously switching the target periods of all the aggregate data displayed in the main region R0 and the six sub-regions R1 to R6 by one operation, it is possible to easily check the aggregation screen of the plurality of parameter values in a target period that the user desires to check.

Figure 12:
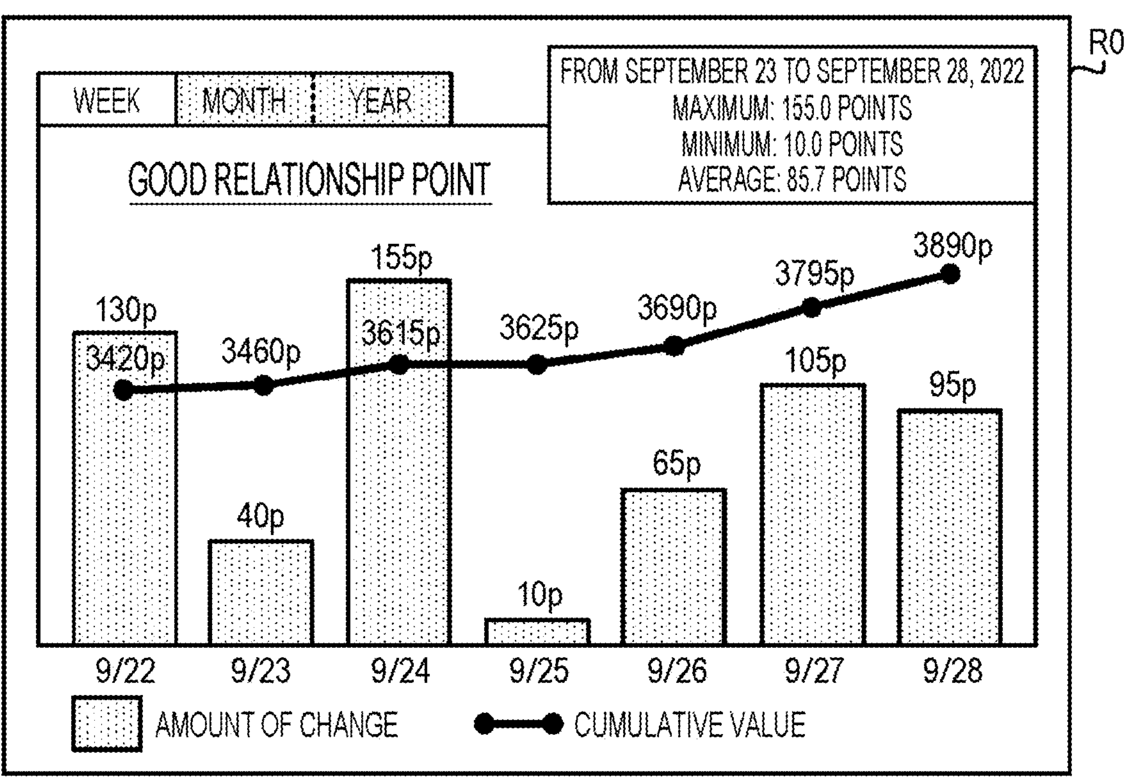
FIG. 12 is a diagram illustrating a display example of aggregate data of a good relationship point according to the first embodiment.

FIG. 12 illustrates an example of a case where the aggregate data of the good relationship point is displayed in the main region R0. The display control unit 514 displays the transition of the amount of change in the good relationship point in a target period as a bar graph, and displays the transition of the cumulative value of the good relationship point in the target period as a line graph. Further, the display control unit 514 displays the maximum value, the minimum value, and the average value of the amounts of changes in the good relationship point in the target period as statistical information of the good relationship point in the target period in an upper right portion of the main region R0.

For example, in a case where a week is selected as the target period, the display control unit 514 displays the amount of change in the good relationship point and the cumulative value and the statistical information of the good relationship point for each day of the past one week. Furthermore, although not illustrated, in a case where a month or a year is selected as the target period by switching between the tabs T1 to T3, the display control unit 514 displays the amount of change in the good relationship point and the cumulative value and the statistical information of the good relationship point in each week of the past one month or each month of the past one year. As a result, the user can easily check how the relationship of the robot 200 has changed.

Figure 13:
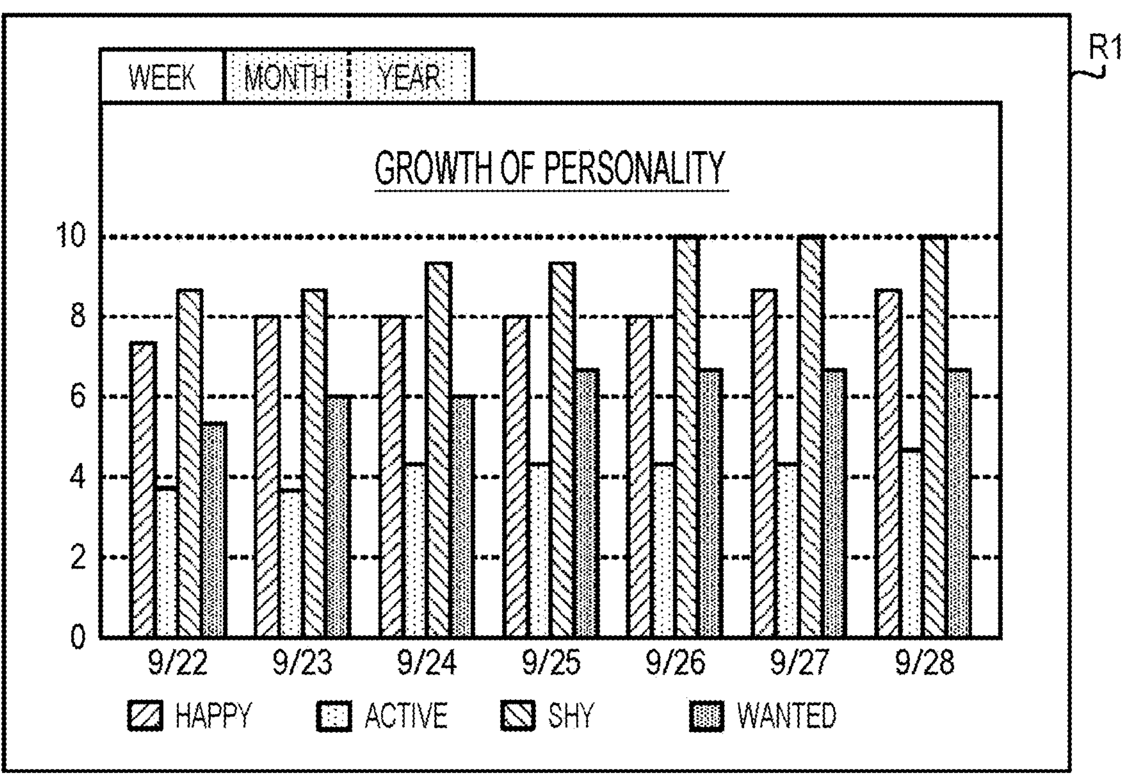
FIG. 13 is a diagram illustrating a display example of aggregate data of a personality parameter according to the first embodiment.

FIG. 13 illustrates an example of a case where the aggregate data of the personality parameter is displayed in the main region R0. The display control unit 514 displays transitions of the four personality values in the target period as bar graphs. In a case where a week is selected as the target period, the display control unit 514 displays the four personality values of “happy”, “active”, “shy”, and “wanted” for each day of the past one week. Furthermore, although not illustrated, in a case where a month or a year is selected as the target period by switching between the tabs T1 to T3, the display control unit 514 displays the four personality values in each week of the past one month or each month of the past one year. This allows the user to check how the personality parameter of the robot 200 has grown.

Figure 14:
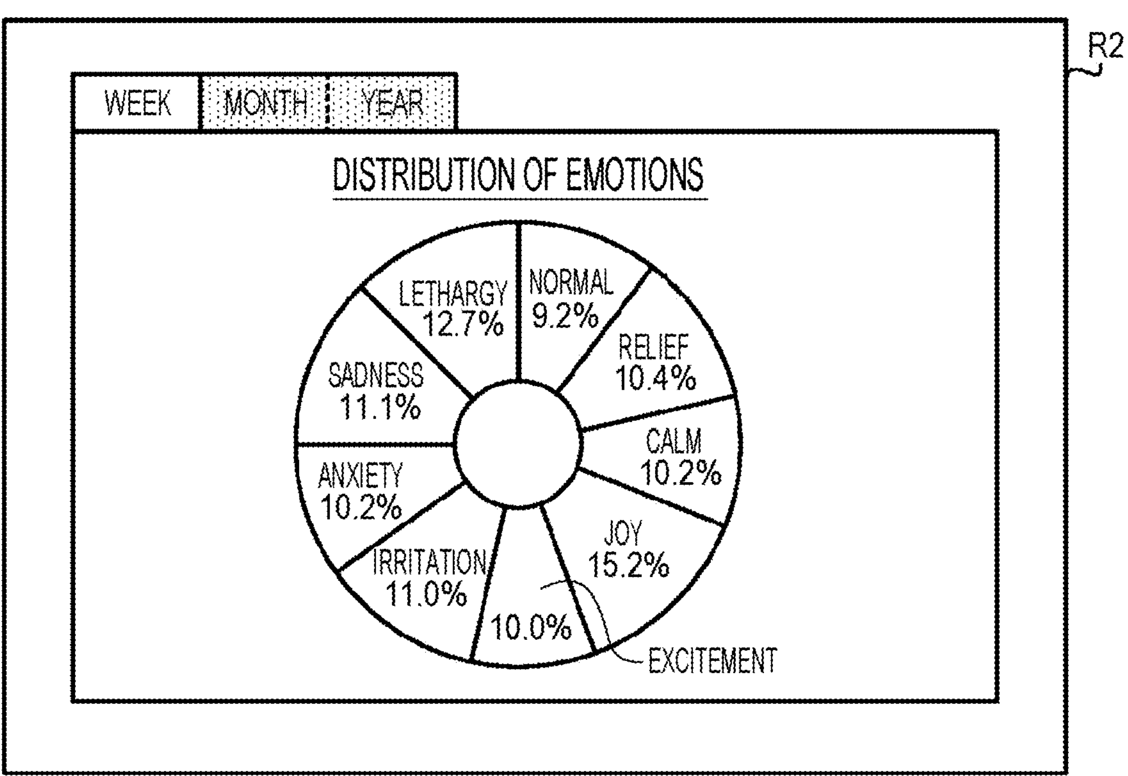
FIG. 14 is a diagram illustrating a display example of aggregate data of an emotion parameter according to the first embodiment.

FIG. 14 illustrates an example of a case where aggregate data of the emotion parameter is displayed in the main region R0. The display control unit 514 displays the percentages of the nine emotions calculated by the aggregation unit 513 in a circular graph. In a case where a week is selected as the target period, the display control unit 514 displays the percentages of the nine emotions in the past week. Furthermore, although not illustrated, in a case where a month or a year is selected as the target period by switching between the tabs T1 to T3, the display control unit 514 displays the percentages of the nine emotions in the past one month or the past one year. As a result, the user can check a distribution of pseudo emotions held by the robot 200.

Figure 15:
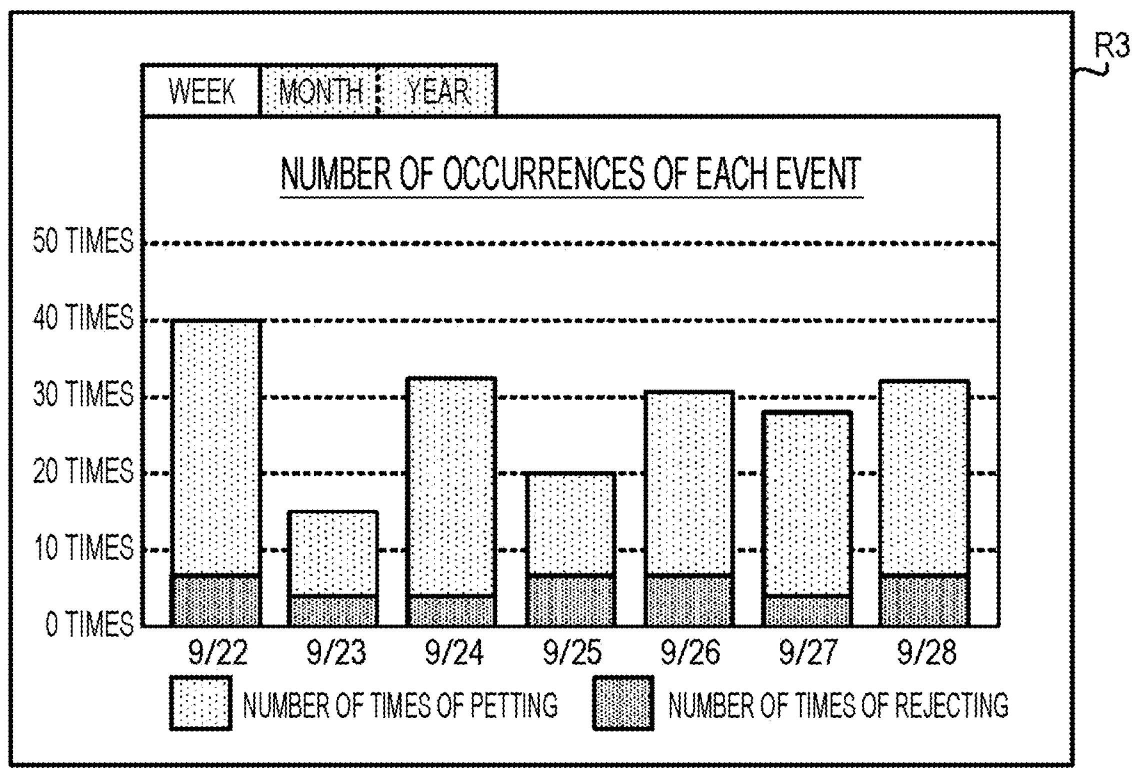
FIG. 15 is a diagram illustrating a display example of first aggregate data of the number of occurrences of each event according to the first embodiment.

FIG. 15 illustrates an example of a case where aggregate data of the number of occurrences of an event for each type is displayed in the main region R0. The display control unit 514 displays transitions of the number of occurrences of the first type of event and the number of occurrences of the second type of event in the target period as bar graphs. Note that, in FIG. 15, the number of occurrences of the first type of event is displayed as the “number of times of petting”, and the number of occurrences of the second type of event is displayed as the “number of times of rejecting”. In a case where a week is selected as the target period, the display control unit 514 displays the number of times of petting and the number of times of rejecting for each day of the past one week. Furthermore, although illustration is omitted, in a case where a month or a year is selected as the target period by switching between the tabs T1 to T3, the number of times of petting and the number of times of rejecting in each week of the past month or each month of the past year are displayed. As a result, the user can check a history of an event that occurred in the target period.

Figure 16:
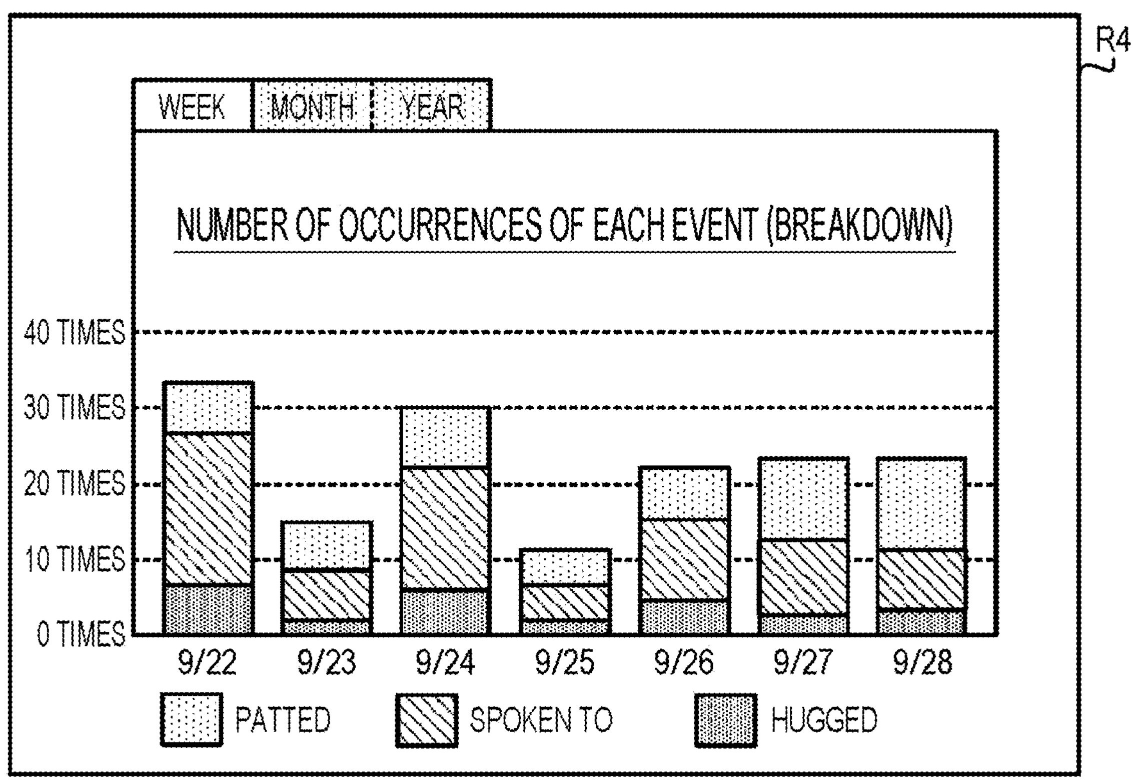
FIG. 16 is a diagram illustrating a display example of second aggregate data of the number of occurrences of each event according to the first embodiment.

FIG. 16 illustrates an example of a case where aggregate data of the number of occurrences of an event for each trigger is displayed in the main region R0. Note that the number of occurrences of an event for each trigger illustrated in FIG. 16 corresponds to a breakdown of the number of times of petting for each trigger (the number of occurrences of the first type of event) illustrated in FIG. 15, but a breakdown of the number of times of rejecting for each trigger (the number of occurrences of the second type of event) may be displayed. In addition, in FIG. 16, only “patted”, “spoken to”, and “hugged” are displayed in order to avoid complication, but other details may be displayed.

The display control unit 514 displays a transition of a breakdown of the number of times of petting for each trigger in the target period as a bar graph. In a case where a week is selected as the target period, the display control unit 514 displays a breakdown of the number of times of petting for each day of the past week. Furthermore, although illustration is omitted, in a case where a month or a year is selected as the target period by switching between the tabs T1 to T3, a breakdown of the number of times of petting in each week of the past one month or each month of the past one year is displayed. As a result, the user can check a history of an event that occurred in the target period in more detail.

Figure 17:
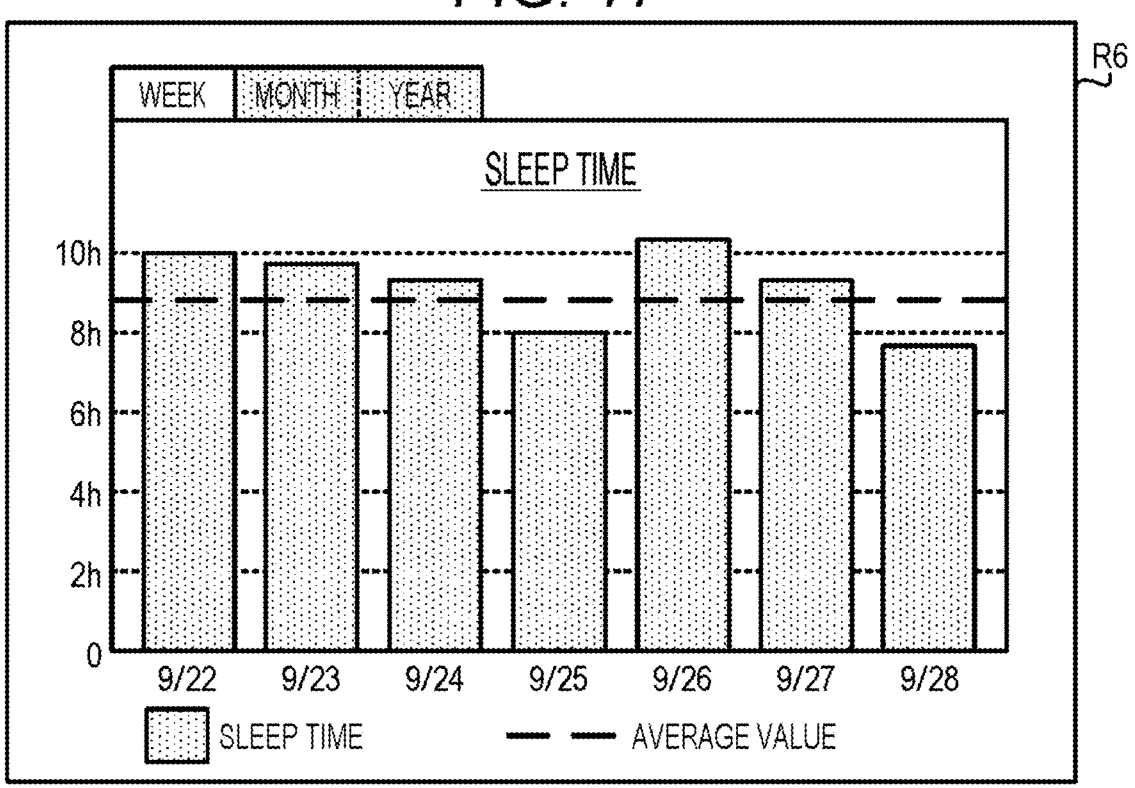
FIG. 17 is a diagram illustrating a display example of aggregate data of sleep time according to the first embodiment.

FIG. 17 illustrates an example of a case where aggregate data of the sleep time is displayed in the main region R0. The display control unit 514 displays the transition of the sleep time in the target period as a bar graph, and displays the average value of the sleep time in the target period as a broken line. In a case where a week is selected as the target period, the display control unit 514 displays the sleep time in each day of the past one week and the average value of the sleep time in the past one week. Furthermore, although not illustrated, in a case where a month is selected as the target period by switching between the tabs T1 to T3, the display control unit 514 displays the sleep time in each week of the past one month and the average value of the sleep time in the past one month. Furthermore, in a case where a year is selected as the target period, the display control unit 514 displays the sleep time in each month in the past one year and the average value of the sleep time in the past one year.

As a result, the user can check the transition of the sleep time of the robot 200. In particular, for example, in a case where the robot 200 also sleeps together when the user is sleeping, such as when the robot 200 enters pseudo sleep triggered by the darkening of a room, the sleep time of the robot 200 can be regarded as corresponding to the sleep time of the user. Therefore, the user can use an aggregation screen for sleep time to check the transition of the user's sleep time.

Figure 18:
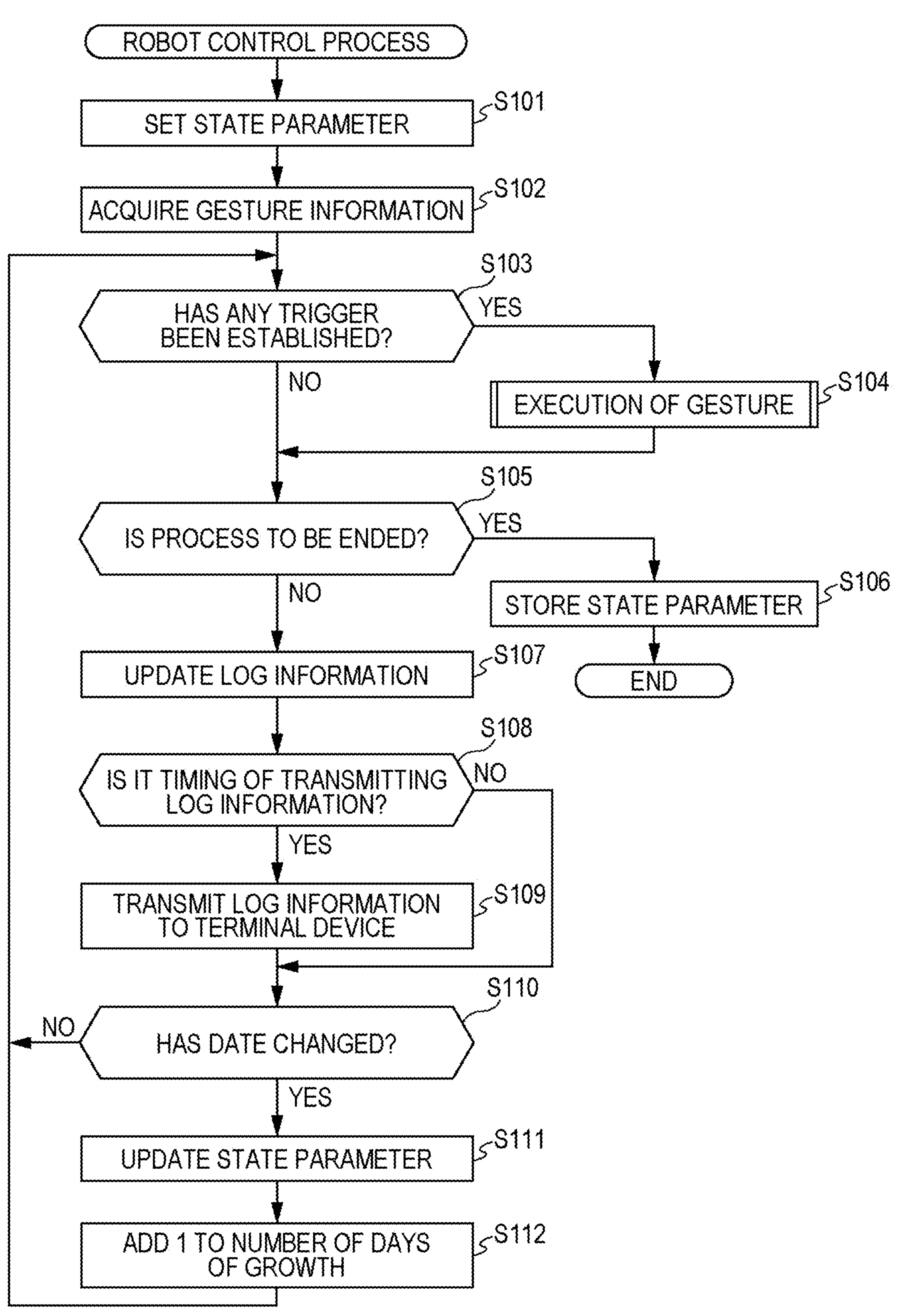
FIG. 18 is a flowchart illustrating a procedure of a robot control process according to the first embodiment.

Next, a procedure of a robot control process will be described with reference to FIG. 18. The robot control process illustrated in FIG. 18 is executed by the control unit 110 of the control device 100 when the user turns on the power of the robot 200. The robot control process is an example of a robot control method.

When the robot control process is started, the control unit 110 sets the state parameter 122 (step S101). At the time of the first activation of the robot 200 (at the time of the first activation by the user after shipment from the factory), the control unit 110 sets the parameter values including the emotion parameter, the personality parameter, and the number of growth days to initial values (for example, 0). On the other hand, at the time of the second or subsequent activation, the control unit 110 reads the value of each parameter value stored in step S106 (to be described later) of the previous robot control process and sets the values as the state parameter 122. However, all the emotion parameters may be initialized to 0 each time the power is turned on.

After the state parameter 122 is set, the control unit 110 communicates with the terminal device 50 and acquires the gesture information 121 created based on an operation of the user in the terminal device 50 (step S102). When the gesture information 121 is already stored in storage unit 120, step S102 may be skipped.

After acquiring the gesture information 121, the control unit 110 determines whether any trigger among the plurality of gesture triggers defined in the gesture information 121 is established (step S103).

In a case where any one of the triggers is established (step S103; YES), the control unit 110 executes a gesture control process and causes the robot 200 to execute a gesture associated with the established trigger (step S104). Details of the gesture control process in step S104 will be described with reference to the flowchart in FIG. 19. Step S104 is an example of a control step.

Figure 19:
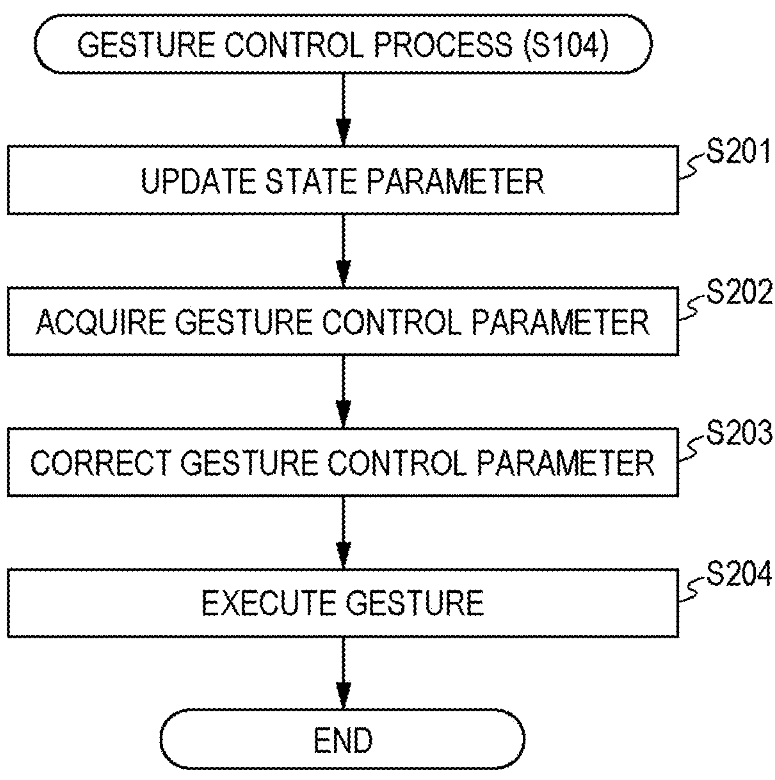
FIG. 19 is a flowchart illustrating a procedure of a gesture control process according to the first embodiment.

When the gesture control process illustrated in FIG. 19 is started, the control unit 110 updates the state parameter 122 (step S201). More specifically, in a case where the trigger established in step S103 is based on an external stimulus, the control unit 110 obtains an emotion change amount corresponding to the external stimulus. Then, the control unit 110 adds or subtracts the obtained emotion change amount to or from the current emotion parameter to update the emotion parameter. Furthermore, during the child period, the control unit 110 calculates each personality value of the personality parameter from the emotion change amount updated in step S108 in accordance with Equations 1 described above. On the other hand, during the adult period, the control unit 110 calculates each personality value of the personality parameter from the emotion change amount updated in step S108 and the personality correction values in accordance with Equations 2 described above.

After updating the state parameter 122, the control unit 110 refers to the gesture information 121 and acquires a gesture control parameter for the gesture associated with the established trigger (step S202). More specifically, the control unit 110 acquires, from the gesture information 121, a combination of an operation or a cry which is an element forming the gesture associated with the established trigger, the timing of starting execution of each element, and the operation parameter or the cry parameter.

After acquiring the gesture control parameter, the control unit 110 corrects the gesture control parameter based on the current state of the robot 200 indicated by the state parameter 122 updated in step S201 (step S203). More specifically, the control unit 110 specifies a correction coefficient corresponding to the current state of the robot 200 from the coefficient table 124, and corrects the gesture control parameter based on the specified correction coefficient.

After correcting the gesture control parameter, the control unit 110 executes the gesture associated with the established trigger (step S204). More specifically, control unit 110 drives the drive unit 220 or outputs a voice from the speaker 231 in accordance with the gesture control parameter corrected in step S203. As described above, the gesture control process illustrated in FIG. 19 ends.

Referring back to FIG. 18, in a case where none of the triggers for the plurality of gestures are established in step S103 (step S103; NO), the control unit 110 skips step S104.

Next, the control unit 110 determines whether or not to end the process (step S105). For example, when the operation unit 240 receives an instruction to turn off the power of the robot 200 from the user, the process is ended. In a case where the process is to be ended (step S105; YES), the control unit 110 stores the current state parameter 122 in the nonvolatile memory of the storage unit 120 (step S106), and ends the robot control process illustrated in FIG. 18.

In a case where the process is not to be ended (step S105; NO), the control unit 110 updates the log information 123 (step S107). More specifically, when the timing of generating the log information 123 (for example, every 10 minutes) arrives, the control unit 110 records the latest values of the parameter values such as the emotion parameter, the personality parameter, the number of occurrences of an event for each trigger, the remaining battery level, and the sleep information at that time in the log information 123.

After updating the log information 123, the control unit 110 determines whether the timing of transmitting the log information 123 has arrived (step S108). When the timing of transmitting the log information 123 has arrived (step S108; YES), the control unit 110 transmits the log information 123 updated in step S107 to the terminal device 50 (step S109).

When the timing of transmitting the log information 123 has not arrived (step S108; NO), the control unit 110 skips step S109.

Next, the control unit 110 uses a clock function to determine whether the date has changed (step S110). In a case where the date has not changed (step S110; NO), the process returns to step S103.

In a case where the date has changed (step S110; YES), the control unit 110 updates the state parameter 122 (step S111). More specifically, in the child period (for example, 50 days from birth), the control unit 110 changes the values of the emotion change amounts DXP, DXM, DYP, and DYM according to whether or not the emotion parameter has reached the maximum value or the minimum value of the emotion map 300. Furthermore, in a case where the robot 200 is in the child period, the control unit 110 enlarges the emotion map 300 by a predetermined increase amount (for example, 2) for both the maximum value and the minimum value. On the other hand, in the adult period, the control unit 110 adjusts the personality correction values.

After updating the state parameter 122, the control unit 110 adds 1 to the number of growth days (step S112), and the process returns to step S103. Then, as long as the robot 200 operates normally, the control unit 110 repeats the processing from step S103 to step S112.

Figure 20:
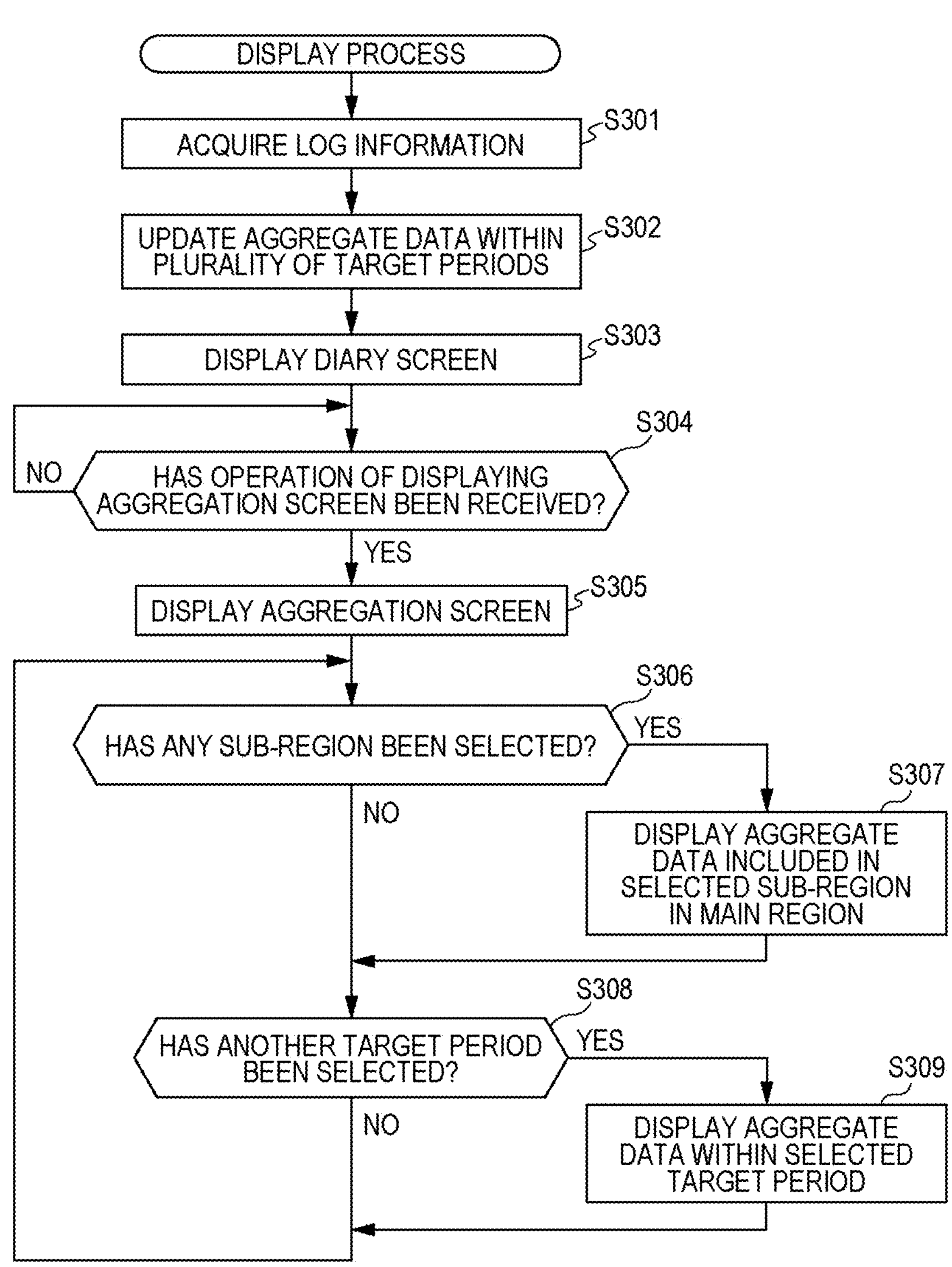
FIG. 20 is a flowchart illustrating a procedure of a display process according to the first embodiment.

Next, a procedure of a display process executed in the terminal device 50 will be described with reference to FIG. 20. The display process illustrated in FIG. 20 is executed by the control unit 510 of the terminal device 50 when the user inputs an operation of displaying the diary screen to the terminal device 50. The display process is an example of a display method.

When the display process is started, the control unit 510 acquires the log information 123 transmitted from the control device 100 of the robot 200 in step S108 (step S301).

After acquiring the log information 123, the control unit 510 updates aggregate data in the plurality of target periods based on the acquired log information 123 (step S302). Specifically, the control unit 510 generates the latest aggregate data of each of the emotion parameter, the personality parameter, the sleep time, the number of occurrences of an event for each type, the number of occurrences of an event for each trigger, and the good relationship point in each target period of the week, the month, and the year.

After updating the aggregate data, the control unit 510 displays the diary screen on the display unit 540 illustrated in FIG. 10, for example (step S303).

After displaying the diary screen, the control unit 510 determines whether an operation of displaying the aggregation screen has been received (step S304). Specifically, the control unit 510 determines whether or not the icon Al of "record training" in the diary screen has been selected by the user.

In a case where the operation of displaying the aggregation screen has not been received (step S304; NO), the control unit 510 remains in step S304 and continues the display of the diary screen.

In a case where the operation of displaying the aggregation screen has been received (step S304; YES), the control unit 510 displays the aggregation screen illustrated in FIG. 11 on the display unit 540, for example (step S305).

After displaying the aggregation screen, the control unit 510 determines whether or not any sub-region of the six sub-regions R1 to R6 has been selected (step S306). When any sub-region is selected (step S306; YES), the control unit 510 displays aggregate data included in the selected sub-region in the main region R0 (step S307). On the other hand, when no sub-region is selected (step S306; NO), the control unit 510 skips step S307.

Next, the control unit 510 determines whether a target period different from the current target period has been selected in the aggregate data displayed in the main region R0 (step S308). More specifically, the control unit 510 determines whether or not an operation of switching the target period by selecting any of the tabs T1 to T3 has been received from the user.

When another target period is selected (step S308; YES), the control unit 510 displays aggregate data in the selected target period in the main region R0 (step S309). In other words, the control unit 510 switches the aggregate data displayed in main region R0 to the aggregate data in the selected target period. On the other hand, when another target period is not selected (step S308; NO), the control unit 510 skips step S309.

Thereafter, the control unit 510 returns the process to step S306. Then, the control unit 510 repeats the processing of steps S306 to S309 while the aggregation screen continues to be displayed. Note that, in a case where an operation of ending the display of the diary screen or the aggregation screen is received from the user, the control unit 510 ends the display process illustrated in FIG. 20.

As described above, the terminal device 50 according to the first embodiment acquires the log information of the parameter values related to the robot 200, generates aggregate data of the parameter values in the target period based on the acquired log information, and displays the generated aggregate data on the display screen. In this manner, by generating and displaying the aggregate data of the parameter values in the target period, it is possible to visually present the information of the parameter values that have changed according to a plurality of events that have occurred in the past, and it is possible to allow the user to easily check a record of an event related to the robot 200.

In particular, the terminal device 50 according to the first embodiment generates aggregate data of the parameter values in each of the plurality of target periods having different time lengths, and displays aggregate data in a target period selected by the user from among the plurality of target periods on the display screen. As described above, since the user can select a target period in which aggregate data is displayed from among the plurality of target periods, the user can easily switch and check records of an event in the different target periods.

MODIFIED EXAMPLES

Although the embodiment of the present disclosure has been described above, the above-described embodiment is an example, and the application range of the present disclosure is not limited thereto. That is, the embodiment of the present disclosure can be applied in various ways, and all embodiments are included in the scope of the present disclosure.

For example, in the above-described embodiment, the aggregation unit 513 generates, as aggregate data to be displayed on the aggregation screen, aggregate data of each of the emotion parameter, the personality parameter, the sleep time, the number of occurrences of an event for each type, the number of occurrences of an event for each trigger, and the good relationship point. However, this is merely an example, and the aggregation unit 513 may generate aggregate data of only some of these parameter values or aggregate data other than the aggregate data of these parameter values.

In the above-described embodiment, the aggregation unit 513 generates aggregate data by setting each of the past one week, the past one month, and the past one year from the current point of time as the target period. However, the target period is not limited to the period of such a time length, and may be a period of an arbitrary time length at an arbitrary time point in the past.

Furthermore, the aggregation unit 513 may generate aggregate data in each past weekly period, each past monthly period, and each past annual period as target periods. In other words, the aggregation unit 513 may generate aggregate data in each of a plurality of target periods having a time length of one week, a plurality of target periods having a time length of one month, and a plurality of target periods having a time length of one year, and the display control unit 514 may switch and display the plurality of target periods on the aggregation screen.

In the above embodiment, the terminal device 50 which is an example of the display control device includes the display unit 540, and is a separate device independent from the robot 200. However, the terminal device 50 may not include the display unit 540, and the above-described diary screen and aggregation screen may be displayed on a display present outside the terminal device 50. The display control device and the display may be provided in the robot 200. In other words, the robot 200 may include a display such as a liquid crystal display or a projector, and cause the display to display the diary screen and the aggregation screen described above.

In the above-described embodiment, the control device 100 is built in the robot 200, but the control device 100 may be a separate device (for example, a server) without being built in the robot 200. In a case where the control device 100 is present outside the robot 200, the control device 100 communicates with the robot 200 via the communication unit 130 to transmit and receive data to and from each other, and controls the robot 200 as described above in the embodiment.

In the above-described embodiment, the exterior 201 is formed in a cylindrical shape from the head portion 204 to the body portion 206, and the robot 200 has an abdominal crawling shape. However, the robot 200 is not limited to simulating a living thing having an abdominal crawling shape. For example, the robot 200 may have a shape having limbs and may simulate a four-legged walking or two-legged walking living thing.

Furthermore, the robot is not limited to the robot 200 simulating a living thing. For example, the robot may be a wristwatch, a stationary, an imaging device such as a camera, a robot simulating a projector, or the like as long as the robot is a device capable of expressing individuality by executing various gestures. Even a robot other than the robot 200 can be explained in the same manner as in the above-described embodiment by having the same configuration and functions as those of the robot 200 described above.

In the above-described embodiment, in the control unit 110, the CPU executes the program stored in the ROM to function as each of the units such as the state parameter acquisition unit 112. In addition, in the control unit 510, the CPU executes the program stored in the ROM to function as each of the units such as the log information acquisition unit 512. However, in the present disclosure, the control units 110 and 510 may include dedicated hardware such as an application specific integrated circuit (ASIC), a field-programmable gate array (FPGA), or various control circuits instead of the CPUs, and the dedicated hardware may function as each of the units such as the state parameter acquisition unit 112. In this case, the functions of the respective units may be implemented by individual hardware, or the functions of the respective units may be collectively implemented by a single hardware unit. In addition, some of the functions of the respective units may be implemented by dedicated hardware, and the other functions may be implemented by software or firmware.

Note that it is possible not only to provide the robot 200 or the terminal device 50 having a configuration for implementing the functions according to the present disclosure in advance, but also to cause an existing information processing device or the like to function as the robot 200 or the terminal device 50 according to the present disclosure by applying a program. That is, by applying a program for implementing each functional configuration by the robot 200 or the terminal device 50 exemplified in the above embodiment so that a CPU or the like that controls an existing information processing device or the like can execute the program, the program can function as the robot 200 or the terminal device 50 according to the present disclosure.

In addition, a method of applying such a program is arbitrary. The program can be stored and applied in a computer-readable recording medium such as a flexible disk, a compact disc (CD)-ROM, a digital versatile disc (DVD)-ROM, or a memory card. Furthermore, the program may be superimposed on a carrier wave and applied via a communication medium such as the Internet. For example, the program may be posted and distributed to a bulletin board system (BBS) on a communication network. Then, the program may be started and executed in the same manner as other application programs under control by an operating system (OS) so that the above-described processing can be executed.

Although the preferred embodiments and the like of the present disclosure have been described above, the present disclosure is not limited to the above-described embodiments and the like, and various modifications and substitutions can be made to the above-described embodiments and the like without departing from the scope described in the claims.

What is claimed is:

1. A display control device comprising:

one or more processors configured to:

acquire a parameter value that is related to a robot executing a gesture according to an event, the parameter value changing according to the event;

generate aggregate data of the parameter value acquired at a plurality of target periods that are different from one another, wherein each one of the plurality of target periods is a respective time period ranging from a respective past time to a current time in a training period of the robot, and generation of the aggregate data for a corresponding target period comprises determination of at least one of a change amount, transition, cumulative value, of the parameter value within the corresponding target period within the training period;

cause a display to display the aggregate data, wherein the aggregate data being displayed comprises training results of the robot during the training period of the robot;

generate aggregate data of the parameter value in each of the plurality of target periods having different time lengths; and cause the display to display the aggregate data in a target period selected by a user from among the plurality of target periods.

2. The display control device according to claim 1, wherein:

the parameter value includes a number of occurrences of the event; and the one or more processors are further configured to generate a value indicating a relationship between a user and the robot as the aggregate data based on the number of occurrences of the event in the plurality of target periods.

3. The display control device according to claim 2, wherein:

the value indicating the relationship between the user and the robot increases as the number of occurrences of an event that causes the robot to have a first emotion that is a pseudo predetermined emotion in the plurality of target periods increases; and the value indicating the relationship between the user and the robot decreases as the number of occurrences of an event that causes the robot to have a second emotion different from the first emotion in the plurality of target periods increases.

4. The display control device according to claim 1, wherein:

the parameter value includes a number of occurrences of the event; and the one or more processors are further configured to generate information indicating the number of occurrences of the event in the plurality of target periods for each type as the aggregate data.

5. The display control device according to claim 4, wherein:

the one or more processors are further configured to generate, as the aggregate data, the number of occurrences of an event that causes the robot to have a first emotion that is a pseudo predetermined emotion in the plurality of target periods and the number of occurrences of an event that causes the robot to have a second emotion different from the first emotion in the plurality of target periods.

6. The display control device according to claim 1, wherein:

the parameter value includes an emotion parameter representing a pseudo emotion of the robot; and the one or more processors are further configured to generate information indicating the pseudo emotion of the robot in the plurality of target periods as the aggregate data.

7. The display control device according to claim 1, wherein:

the parameter value includes a personality parameter representing a pseudo personality of the robot; and the one or more processors are further configured to generate information indicating the pseudo personality of the robot in the plurality of target periods as the aggregate data.

8. The display control device according to claim 1, wherein:

the parameter value includes information regarding pseudo sleep of the robot; and the one or more processors are further configured to generate information indicating time of the pseudo sleep of the robot in the plurality of target periods as the aggregate data.

9. A display control system comprising:

the display control device according to claim 1; and the robot.

10. A display method comprising the steps of:

acquiring a parameter value that is related to a robot executing a gesture according to an event, the parameter value changing according to the event;

generating aggregate data of the parameter value acquired at a plurality of target periods that are different from one another, wherein each one of the plurality of target periods is a respective time period ranging from a respective past time to a current time in a training period of the robot, and generation of the aggregate data for a corresponding target period comprises determination of at least one of a change amount, transition, cumulative value, of the parameter value within the corresponding target period within the training period;

causing a display to display the aggregate data, wherein the aggregate data being displayed comprises training results of the robot during the training period of the robot;

generating aggregate data of the parameter value in each of the plurality of target periods having different time lengths; and causing the display to display the aggregate data in a target period selected by a user from among the plurality of target periods.

11. A non-transitory computer-readable recording medium storing a program for causing a computer to:

acquire a parameter value that is related to a robot executing a gesture according to an event, the parameter value changing according to the event; and generate aggregate data of the parameter value acquired at a plurality of target periods that are different from one another, wherein each one of the plurality of target periods is a respective time period ranging from a respective past time to a current time in a training period of the robot, and generation of the aggregate data for a corresponding target period comprises determination of at least one of a change amount, transition, cumulative value, of the parameter value within the corresponding target period within the training period;

cause a display to display the aggregate data, wherein the aggregate data being displayed comprises training results of the robot during the training period of the robot;

generate aggregate data of the parameter value in each of the plurality of target periods having different time lengths; and cause the display to display the aggregate data in a target period selected by a user from among the plurality of target periods.

* * * * *